US012782571B2

(12) United States Patent
Whitley et al.

(10) Patent No.: US 12,782,571 B2
(45) Date of Patent: Nov. 3, 2026

(54) REAL-TIME THERMAL CAMERA BASED ODOMETRY AND NAVIGATION SYSTEMS AND METHODS

(71) Applicant: Teledyne FLIR, LLC, Thousand Oaks, CA (US)

(72) Inventors: Travis James Whitley, Gainesville, FL (US); John H. Perry, Gainesville, FL (US)

(73) Assignee: Teledyne FLIR, LLC, Thousand Oaks, CA (US)

( * ) Notice: Subject to any disclaimer, the term of this patent is extended or adjusted under 35 U.S.C. 154(b) by 1107 days.

(21) Appl. No.: 17/875,222

(22) Filed: Jul. 27, 2022

(65) Prior Publication Data

US 2022/0377261 A1 Nov. 24, 2022

Related U.S. Application Data

(63) Continuation of application No. PCT/US2021/015585, filed on Jan. 28, 2021.

(Continued)

(51) Int. Cl.

*G01S 17/86* (2020.01)
*B64U 101/30* (2023.01)

(Continued)

(52) U.S. Cl.

CPC .............. *G01S 17/86* (2020.01); *G01S 13/08* (2013.01); *G01S 17/08* (2013.01); *G01S 17/933* (2013.01);

(Continued)

(58) Field of Classification Search

CPC ............. G06T 7/20; G06T 2207/10048; G06T 2207/10032; G06T 2207/30244;

(Continued)

(56) References Cited

U.S. PATENT DOCUMENTS 9,915,733 B2 3/2018 Fried et al.
10,107,627 B2 10/2018 Aboutalib et al.

(Continued)

FOREIGN PATENT DOCUMENTS

CN 209355910 U 9/2019
WO WO2012/167301 A1 12/2012

OTHER PUBLICATIONS

Whitley, "Small unmanned aircraft systems for urban structural inspections", Jan. 2018, XP 055852823 (Year: 2018).*

(Continued)

*Primary Examiner* — Yuqing Xiao
*Assistant Examiner* — Chia-Ling Chen
(74) *Attorney, Agent, or Firm* — Haynes and Boone, LLP

(57) ABSTRACT

Thermal imaging odometry and navigation systems and related techniques are provided to improve the operational flexibility of autonomous/unmanned vehicles. A thermal imaging odometry system includes a thermal imaging module configured to be coupled to an unmanned vehicle, a ranging sensor system fixed to the thermal imaging module, and a logic device. The thermal imaging module provides thermal imagery of a scene in view of the unmanned vehicle and centered about an optical axis of the thermal imaging module, where the optical axis is fixed relative to an orientation of the unmanned vehicle. The ranging sensor system provides ranging sensor data indicating a standoff distance between the thermal imaging module and a surface intersecting the optical axis of the thermal imaging module. The logic device receives thermal images of the scene and corresponding ranging sensor data and determines an estimated relative velocity of the unmanned vehicle.

20 Claims, 12 Drawing Sheets

Related U.S. Application Data

(60) Provisional application No. 62/967,004, filed on Jan. 28, 2020.

(51) Int. Cl.

| | |
|---|---|
| ***B64U 101/64*** | (2023.01) |
| ***G01S 13/08*** | (2006.01) |
| ***G01S 17/08*** | (2006.01) |
| ***G01S 17/933*** | (2020.01) |
| ***G06T 7/20*** | (2017.01) |
| ***H04N 23/23*** | (2023.01) |

(52) U.S. Cl.

CPC ............... *G06T 7/20* (2013.01); *H04N 23/23* (2023.01); *B64U 2101/30* (2023.01); *B64U 2101/64* (2023.01); *B64U 2201/10* (2023.01); *G06T 2207/10048* (2013.01); *G06T 2207/30252* (2013.01)

(58) Field of Classification Search

CPC ........... G06T 7/73; G06T 7/246; H04N 23/23; G01S 7/48–51; B64U 2201/10; B64U 2101/30

See application file for complete search history.

(56) References Cited

U.S. PATENT DOCUMENTS

| | | | | |
|---|---|---|---|---|
| 10,151,888 | B2 | 12/2018 | Singh et al. | |
| 2011/0049290 | A1 * | 3/2011 | Seydoux ................ | A63H 27/12 348/114 |
| 2019/0088156 | A1 | 3/2019 | Choi et al. | |
| 2019/0129431 | A1 | 5/2019 | Yalla et al. | |
| 2019/0146500 | A1 | 5/2019 | Yalla et al. | |
| 2019/0302276 | A1 | 10/2019 | Sanford et al. | |
| 2019/0339718 | A1 | 11/2019 | Koch | |

OTHER PUBLICATIONS

Delaune et al., "Thermal-Inertial Odometry for Autonomous Flight Throughout the Night", 2019 IEEE/RSJ inter. Conf. on Intelligent Robots and Systems (IROS), IEEE, Nov. 3, 2019 (Year: 2019).*

Whitely, Travis, "Small Unmanned Aircraft Systems for Urban Structural", Jan. 2018.

Delaune, Jeff et al., "Thermal-Inertial Odometry for Autonomous Flight Throughout the Night", 2019 IEEE/RSJ International Conference on Intelligent Robots and Systems (IROS), IEEE, Nov. 3, 2019, pp. 1122-1128.

Honegger, Dominik et al., "An open source and open hardware embedded metric optical flow CMOS camera for indoor and outdoor applications", 2013 IEEE International Conference on Robotics and Automation (ICRA); May 6, 2010, pp. 1736-1741.

Bieszczad, Grzegorz et al., "The concept of thermovision sensor supporting the navigation of unmanned aerial platforms", Measurement Automation Monitoring, Jan. 1, 2019, pp. 2450-2855.

Whitely, Travis et al., "Design of a Small Unmanned Aircraft System for Bridge Inspections", Sensors 2020.

Yan, Xu et al., "Multi-Plane Visual Odometry for Unmanned Aerial Vehicle Using a Thermal Camera", 2018 IEEE 14th International Conference on Control and Automation (ICCA), 2018, pp. 588-593.

* cited by examiner

REAL-TIME THERMAL CAMERA BASED ODOMETRY AND NAVIGATION SYSTEMS AND METHODS

CROSS-REFERENCE TO RELATED APPLICATIONS

This patent application is a continuation of International Patent Application No. PCT/US2021/015585 filed Jan. 28, 2021 and entitled "REAL-TIME THERMAL CAMERA BASED ODOMETRY AND NAVIGATION SYSTEMS AND METHODS," which claims priority to and the benefit of U.S. Provisional Patent Application 62/967,004 filed Jan. 28, 2020 and entitled "REAL-TIME VISUAL ODOMETRY NAVIGATION UTILIZING A THERMAL CAMERA," all of which are incorporated herein by reference in their entirety.

TECHNICAL FIELD

The present invention relates generally to odometry and, more particularly, to systems and methods for thermal imaging based odometry for and navigation of unmanned aircraft.

BACKGROUND

Autonomous vehicles (e.g., including unmanned aerial vehicles (UAVs), one or a variety of which may be included in unmanned aircraft systems (UASs)) are being used more than ever, and the demand for autonomous/unmanned vehicles in different environments and situations is ever-increasing. For example, in GPS-denied environments (e.g., environments in which GPS is not able to be used), imaging has been used to track and direct autonomous vehicles. However, many of these solutions use imaging systems that require a minimum amount of light and/or visibility. Other solutions require relatively heavy equipment to function and thus limit the payload capacity of the autonomous vehicle. Therefore, it is desirable to provide a relatively light-weight solution for GPS-denied and/or otherwise challenging environments for autonomous vehicles.

SUMMARY

Methods and systems for controlling an autonomous/unmanned vehicle using thermal optical odometry are described. Features of the systems for controlling the autonomous vehicle using optical odometry can be implemented as a new system or standalone component or integrated into an existing autonomous vehicle system. Embodiments allow an autonomous vehicle to receive a destination position and, without the aid of GPS and other external aids (e.g., beacons and/or visual aids), navigate to that destination position, even in low to no light conditions with little to no visibility (e.g., at night and/or in heavy fog and smoke and/or indoors with no external lighting).

In one embodiment, a method for controlling an autonomous/unmanned vehicle includes receiving a destination position; receiving a first thermal image with first corresponding information including roll, pitch, and yaw angle measurements for the first thermal image, an indication of time for the first thermal image corresponding to a time the first thermal image is taken, and an altitude measurement for the first thermal image; identifying at least one point of interest in the first thermal image; receiving a second thermal image with second corresponding information including roll, pitch and yaw angle measurements for the second thermal image, an indication of time for the second thermal image corresponding to a time the second thermal image is taken, and an altitude measurement for the second thermal image; matching at least one point of interest in the second thermal image to the at least one point of interest in the first thermal image to identify at least one matched point of interest in the second thermal image; calculating an optical flow rate using a difference between a position of the at least one point of interest in the first thermal image and a position of the at least one matched point of interest in the second thermal image; determining a net flow rate by adjusting the optical flow rate using an angular velocity calculated using at least the roll and pitch angle measurements for the first thermal image and the second thermal image; calculating an estimated relative velocity of the autonomous vehicle by multiplying the net flow rate and a distance calculated using at least the altitude measurement for the second thermal image and the matched point of interest in the second thermal image; determining a global reference velocity (e.g., an absolute velocity, referenced to a global or common reference frame) of the autonomous vehicle by reorienting the estimated relative velocity of the autonomous vehicle using the roll, pitch, and yaw angle measurements for the second thermal image; calculating a distance traveled by the autonomous vehicle by multiplying the global reference velocity of the autonomous vehicle and a difference between the indication of time for the first thermal image and the second thermal image; and adjusting a direction/heading of the autonomous vehicle, using the distance traveled by the autonomous vehicle and the destination position, to a course that will reach the destination position.

In another embodiment, thermal imaging odometry system (TIOS) for an unmanned vehicle includes a thermal imaging module configured to be coupled to the unmanned vehicle and provide thermal imagery of a scene in view of the unmanned vehicle that is centered about an optical axis of the thermal imaging module, where the optical axis of the thermal imaging module is fixed relative to an orientation of the unmanned vehicle. The TIOS may also include a ranging sensor system fixed relative to the thermal imaging module and configured to provide ranging sensor data indicating a standoff distance between the thermal imaging module and a surface disposed within the scene and intersecting the optical axis of the thermal imaging module.

In such embodiment, the TIOS may include a logic device coupled to and/or integrated with the thermal imaging module, the ranging sensor system, and/or the unmanned vehicle, for example, that is configured to receive a first thermal image of the scene at a first time from the thermal imaging module and corresponding first ranging sensor data from the ranging sensor system fixed relative to the thermal imaging module; receive a second thermal image of the scene at a second time and corresponding second ranging sensor data from the ranging sensor system; and determine an estimated relative velocity of the unmanned vehicle based, at least in part, on the received first and second thermal images and the respective corresponding first and second ranging sensor data.

In another embodiment, a method includes receiving a first thermal image of a scene about an unmanned vehicle at a first time from a thermal imaging module coupled to the unmanned vehicle and corresponding first ranging sensor data from a ranging sensor system fixed relative to the thermal imaging module, where the thermal imaging module is configured to provide thermal imagery of the scene that is centered about an optical axis of the thermal imaging module, the optical axis of the thermal imaging module is fixed relative to an orientation of the unmanned vehicle, and the ranging sensor system is configured to provide ranging sensor data indicating a standoff distance between the thermal imaging module and a surface disposed within the scene and intersecting the optical axis of the thermal imaging module. The method may also include receiving a second thermal image of the scene at a second time and corresponding second ranging sensor data from the ranging sensor system and determining an estimated relative velocity of the unmanned vehicle based, at least in part, on the received first and second thermal images and the respective corresponding first and second ranging sensor data.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

Figure 1A:
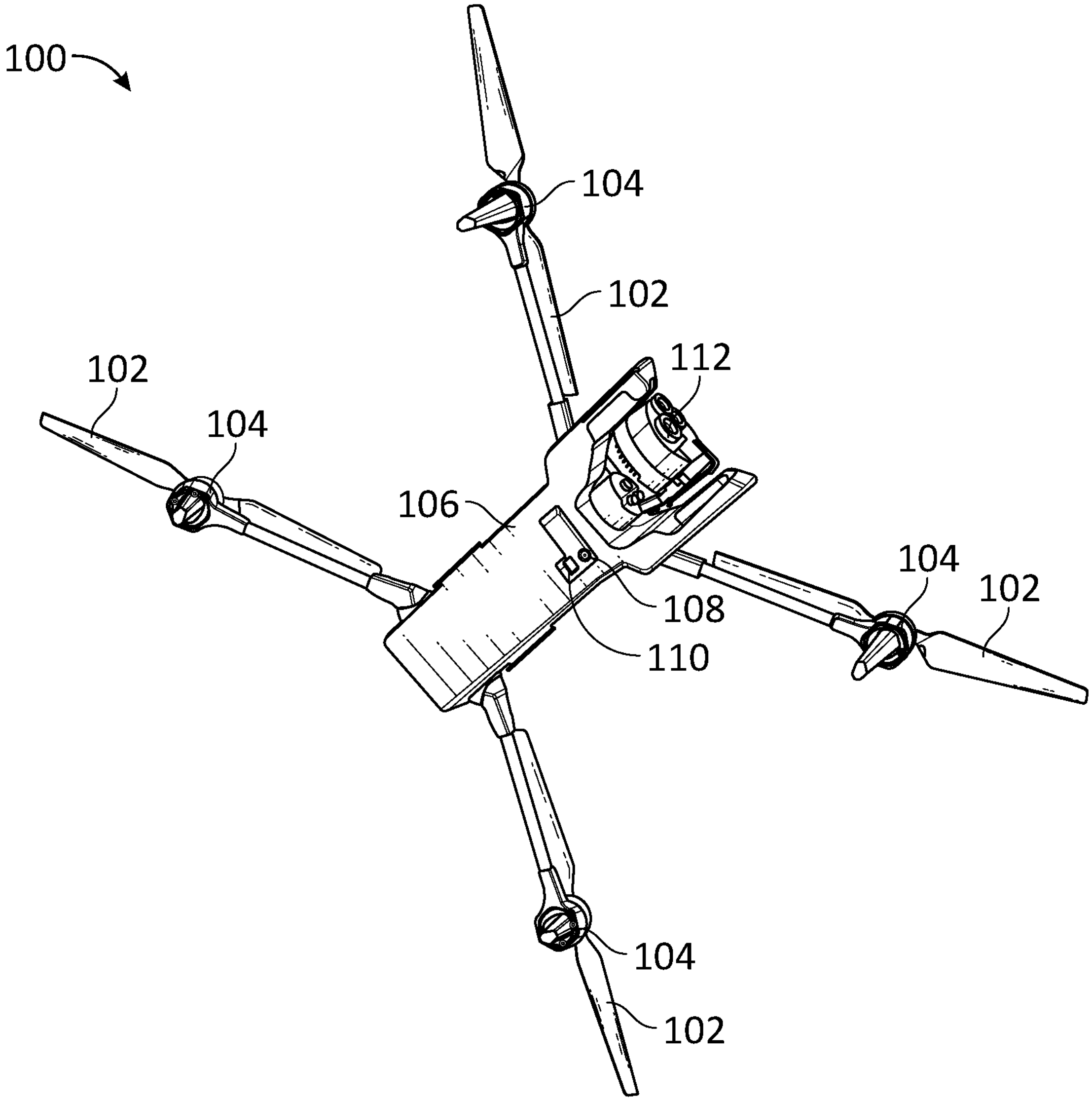
FIGS. 1A-E illustrate an autonomous/unmanned vehicle equipped to implement real-time optical odometry navigation in accordance with an embodiment of the disclosure.
Figure 1B:
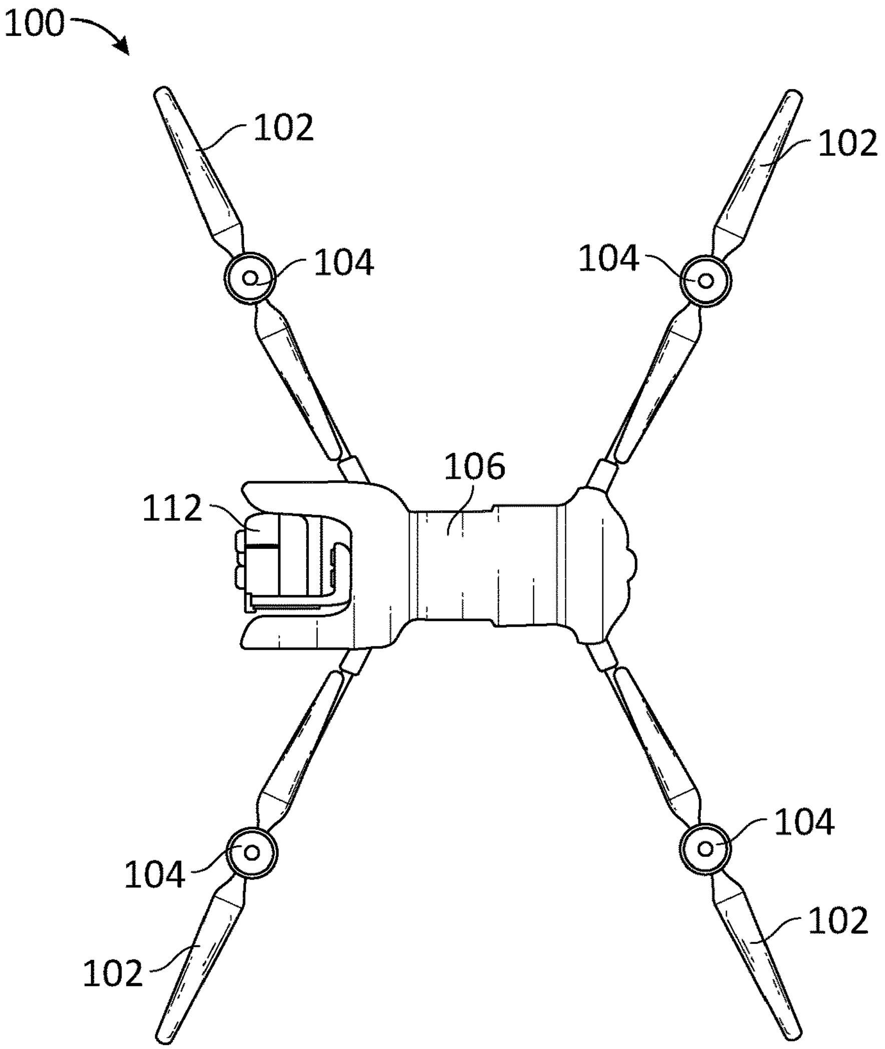
Figure 1C:
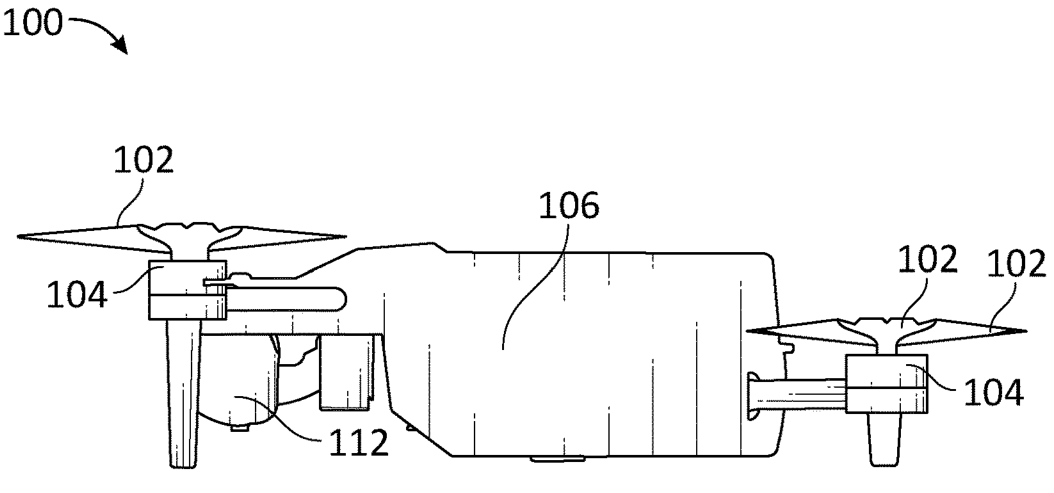
Figure 1D:
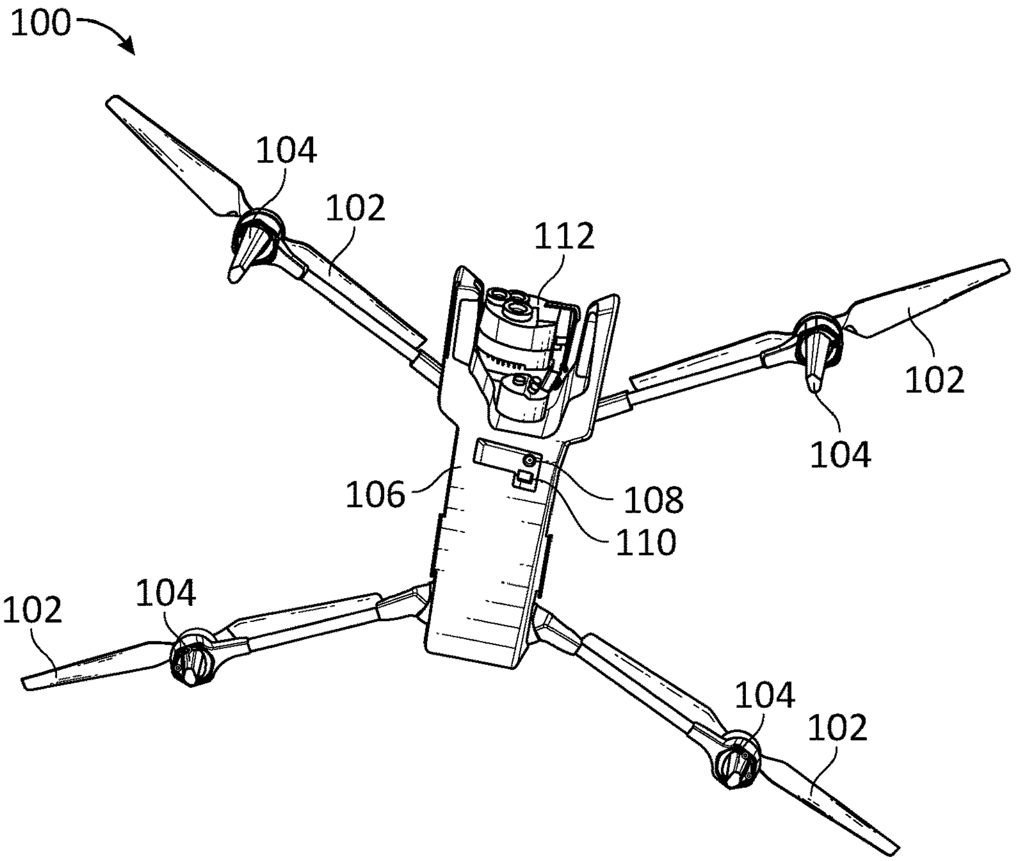
Figure 1E:
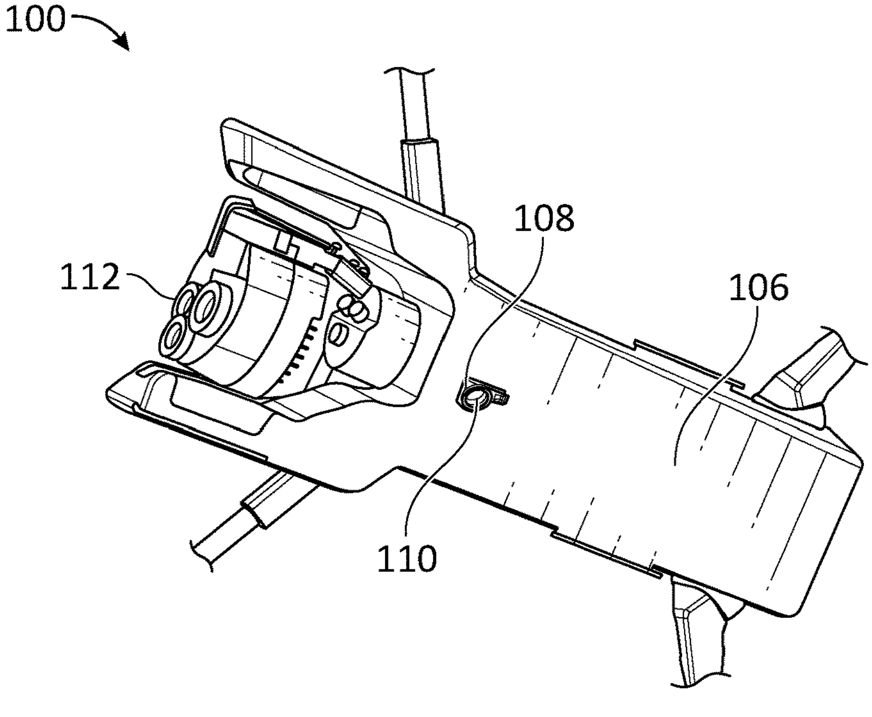

Methods and systems for controlling an autonomous/unmanned vehicle using optical odometry are described. It should be understood that features of the systems for controlling the autonomous vehicle using optical odometry can be implemented as a new system or standalone component or integrated into an existing autonomous vehicle system. This invention allows an autonomous vehicle to receive a destination position and, without the aid of a global positioning system (GPS) and/or other global navigation satellite systems (GNSSs) and other external aids (e.g., beacons and/or visual aids), navigate to that destination position, even in low to no light conditions with little to no visibility (e.g., at night and/or in heavy fog and smoke and/or indoors with no external lighting).

FIGS. 1A-1E illustrate an autonomous vehicle equipped to implement real-time optical odometry navigation. The autonomous vehicle 100 includes a plurality of propellers 102 that are powered via motors 104. The autonomous vehicle 100 also includes a control unit housing 106 that houses the control system of the autonomous vehicle 100 (e.g., see FIGS. 3 and 4). Also included in the control unit housing 106 is a thermal camera 108 and a laser rangefinder 110. The thermal camera 108 provides an advantage over electro-optical (EO) visible spectrum cameras because it allows for useful images to be taken in conditions of low to no light, or when external environmental conditions reduce visibility (e.g., a foggy or smoky environment). Indeed, a similar system using an EO camera would not provide useful images that can be used by an optical odometry algorithm in reduced visibility conditions. In some cases, such thermal camera is implemented by a FLIR Lepton 3.5.

It should be understood that the thermal imaging camera 108 and the laser rangefinder 110 are fixed in place. Therefore, the roll, pitch, and yaw angle measurements of the images captured by the thermal camera 108 and the distance measured by the laser rangefinder 110 should be taken into account in order to provide accurate variables into an optical odometry algorithm that is used to control the direction/heading of the autonomous vehicle 100 (e.g., because the roll, pitch, and yaw angle measurements of the autonomous vehicle correspond to the roll, pitch, and yaw angle measurements of the autonomous thermal camera 108 and the laser rangefinder 110 because they are fixed in place).

As explained in more detail below, the thermal camera 108 is used, along with other instruments including, in some cases, the laser rangefinder 110, to provide information to the computing system and autopilot system so that the position and direction/heading of the autonomous vehicle 100 can be accurately mapped and controlled. For instance, a barometer may be used in place of or in addition to a laser rangefinder 110. As an example, the laser-rangefinder 110 can be used to determine a height of the autonomous vehicle above the ground until the laser-rangefinder 110 is out of range; and then a barometer can be used to estimate the autonomous vehicle's height above the ground by subtracting the current altitude minus the last known altitude corresponding to the last reading of the laser-rangefinder. In some cases, the rangefinder may have a range of 10 feet to 500 feet. In other cases, the rangefinder may have a range above 500 feet (up to and beyond a mile). However, generally speaking, the greater the range of a rangefinder, the heavier the rangefinder itself is, which decreases the payload capacity of the autonomous vehicle. Therefore, this trade-off should be considered when selecting the appropriate rangefinder. It should be understood that the height above the ground can be used to scale the thermal images.

In some cases, a two-dimensional gyroscope or gyro sensor may be used to measure the roll and pitch angles of the autonomous vehicle at any given time. In some cases, a magnetometer can be used to provide the yaw angle of the autonomous vehicle at any given time. In some cases, an inertial measurement unit (IMU) can be used to provide a check on the described method and/or to be used when points of interest are not matched between consecutive images, as is described in more detail below.

The autonomous vehicle 100 also includes additional imaging equipment 112 (e.g., a high-definition video camera). However, the additional imaging equipment 112 is not necessary to implement the described systems and methods for implementing real-time optical odometry utilizing a thermal imaging camera. Indeed, the additional imaging equipment 112 may be used to record the autonomous vehicle's path for later viewing, for example, or may be used to provide instantaneous viewing of the autonomous vehicle's path at an offsite location. In other implementations, the additional imaging equipment 112 may be used similarly to the thermal camera 108 until the autonomous vehicle 100 enters visually difficult conditions, at which point the autonomous vehicle 100 will rely on the thermal camera to provide the images for optical odometry.

In FIGS. 1A-E, the autonomous vehicle 100 is an aerial vehicle, however in some cases, the autonomous vehicle may be an underwater vehicle, water surface vehicle, or a dry surface vehicle. It should be understood that, although the type of vehicle may differ (and therefore the instruments that provide certain measurements may differ), the method and system for implementing real-time optical odometry utilizing a thermal imaging camera would remain substantially the same.

Figure 2A:
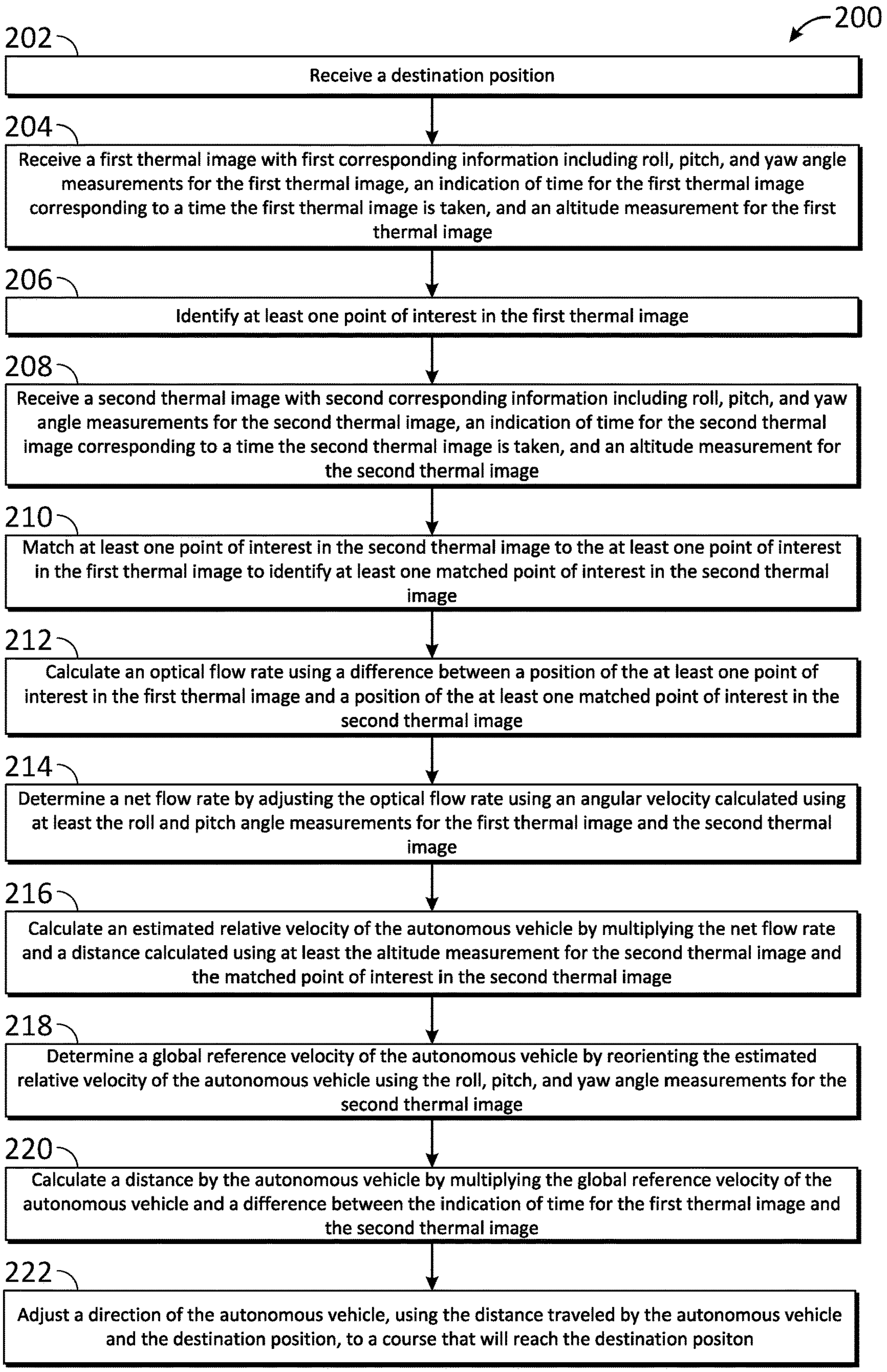
FIG. 2A illustrates a process flow diagram for real-time optical odometry navigation in accordance with an embodiment of the disclosure.

FIG. 2A illustrates a process flow diagram for real-time optical odometry navigation. The method 200 for controlling an autonomous vehicle includes receiving (202) a destination position. The method 200 further includes receiving (204) a first thermal image from a thermal imaging camera mounted to the autonomous vehicle as well as first corresponding information. The first corresponding information can include a roll and pitch measurement from a gyroscope or gyro sensor, a yaw measurement from a magnetometer, an indication of time for the first thermal image corresponding to a time the first thermal image is taken, and an altitude measurement for the first thermal image. In some cases, the altitude measurement is obtained by a laser rangefinder. In other cases, the altitude measurement is obtained from a barometer. In other cases, a laser rangefinder and a barometer are both used to obtain altitude measurements. Using a feature detection algorithm, at least one point of interest can be identified (206) from the first thermal image. In some cases, the feature detection algorithm is a corner detection algorithm.

The method 200 further includes receiving (208) a second thermal image from a thermal imaging camera mounted to the autonomous vehicle as well as a second corresponding information. The second corresponding information can include a roll and pitch from the gyroscope or gyro sensor, a yaw measurement from a magnetometer, an indication of time for the second thermal image corresponding to a time the second thermal image is taken, and an altitude measurement for the second thermal image. At least one point of interest in the second thermal image is matched (210) to the at least one point of interest in the first thermal image to identify a matched point of interest in the second thermal image. In some cases, the at least one point of interest in the second thermal image can be matched to the at least one point of interest in the first thermal image using a Lucas-Kanade optical flow algorithm or other feature matching algorithms, as described herein. More generally, optical flow is a method of comparing subsequent camera frames to determine changes in the position of objects relative to the camera. In unmanned aerial systems (UASs), optical flow may be used to assist in navigation, collision avoidance, and landing sequence applications, as described herein.

It should also be understood that more than one point of interest can be matched between the first and the second thermal image. For example, there may many matched points of interest between figures; and the more matches between the figures, the more certain the distance traveled by the autonomous vehicle, as is explained in more detail below. Furthermore, even if only one point of interest is matched between the first and the second thermal image, another point of interest may be identified in the second thermal image. This newly identified point of interest can be useful during a recursive/looped process.

For instance, assuming an autonomous vehicle is traveling north, a point of interest may appear in the middle of a first thermal image. That same point of interest may appear in the bottom half (e.g., southern portion) of a second thermal image and be matched with the corresponding point of interest in the first thermal image. However, in a third thermal image, that point of interest may no longer be visible (e.g., due to the travel of the autonomous vehicle). Therefore, the autonomous vehicle may look to identify an additional point of interest in the middle or upper half (e.g., northern portion) of the second thermal image so that the additional point of interest can be identified in the third thermal image. Thus, while this method 200 only requires the identification of one point of interest per image, in cases that the autonomous vehicle will travel a distance in which a single point of interest will no longer remain in successive thermal images, an additional point of interest may be required to continue the recursive/looped portion of this method, which is explained further below. However, in some cases, a plurality of feature points may be identified in each image and matched to the previously received image.

In general, finding points of interest in a thermal image differs from techniques used with visible spectrum images both qualitatively and processing of the image itself. First, because thermal imagery often lacks the detail of visible spectrum imagery, the algorithm for detecting candidates for points of interest requires a higher threshold for what defines a unique point. For example, in embodiments described herein, a pixel gradient is determined for each candidate point of interest, and candidate points that are used for matching are those whose threshold magnitudes are greater than a preselected percentage of the highest gradient. A relatively high percentage threshold (e.g., the sharpest/unique points) is used for reliable thermal image processing, as compared to visible spectrum image processing. Moreover, a dynamic gain of the thermal camera may be used to exaggerate pixel differences to help identify unique points of interest. Finally, a relatively large minimum difference is used for selecting feature points in order to prevent the matching of superficially similar feature points since thermal imagery is not as sharp as visible spectrum imagery and is more susceptible to inaccurate matching. Other feature point identification and/or matching algorithms that can be used specifically for thermal imaging are contemplated.

The method 200 further includes calculating (212) an optical flow rate using a difference between a position of the at least one point of interest in the first thermal image and a position of the at least one matched point of interest in the second thermal image. In some cases, the method 200 includes determining pixel displacement from between a position of the at least one point of interest in the first thermal image and a position of the at least one matched point of interest in the second thermal image.

In some cases, because thermal imaging is notorious for being noisy, the matched point of interest in the second thermal image and the point of interest in the first thermal image (e.g., the matched data set) is passed to an outlier rejection scheme which thresholds a point of interest displacement based off of a z-score associated with the point of interest (e.g., a z-score or standard score represents how many standard deviations a given measurement deviates from the mean, or serves to specify the precise location of each observation within a distribution). This outlier rejection scheme can be used to eliminate false positives, which can skew the optical flow calculation.

In cases in which more than one point of interest are found in the first thermal image and matched in the second thermal image, the difference (e.g., pixel displacement) between each matched point of interest can be averaged; and a standard deviation of the difference between each matched point of interest can be calculated. The average displacement (e.g., an updated optical flow rate), the standard deviation, and the number of points of interest used for the average displacement can then be sent to an autopilot for fusion in an extended Kalman filter (e.g., the nonlinear version of the Kalman filter that linearizes about an estimate of the current mean and covariance).

As an example, a focal length of the first thermal image and the second thermal image as well as a difference between the indication of time between the first thermal image and the second thermal image can also be used to help calculate the optical flow rate. In some cases, the focal length of the first thermal image and the focal length of the second thermal image is the same; in other cases, the focal lengths of the first thermal image and the second thermal image are different.

In particular cases where the unmanned vehicle is travelling generally along the optical axis of the thermal camera, the average displacement of matched points of interest will tend towards zero, and instead of the field of points of interest moving in a common direction within the thermal images, the field of points of interest will dilate or contract. In such cases, the dilation or contraction can be characterized and used to supplement ranging sensor data indicating the standoff distance between the thermal camera and a surface within the field of view of the thermal camera, for example, or to help construct a depth map corresponding to the field of view of the thermal camera. In various embodiments, the contribution of such dilation or contraction of the field of points of interest may be characterized (e.g., for use in depth reconstruction) and/or removed from the optical flow rate (e.g., averaging across the field of points of interest is one removal technique) prior to determining a corresponding net flow rate, as described herein.

The method 200 further includes determining (214) a net flow rate by adjusting the optical flow using an angular velocity calculated using at least the roll and pitch angle measurements corresponding to the first thermal image and the second thermal image. As an example, a difference between the indication of time corresponding to the first thermal image and the second thermal image can also be used to help determine the net flow rate. In some cases, the determining (214) step may also include using the yaw angle from the first thermal image and the second thermal image. In some cases, the determining (214) step, along with the subsequent steps in this method 200, are performed by an autopilot system. On the autopilot side, the optical flow rate from the calculating (212) step can be fused with the existing IMU and barometric data to filter out (e.g., using the extended Kalman filter) bad optical flow data before performing the determining (214) step to provide more accurate positional and navigational information to the auto pilot of the autonomous vehicle.

The method 200 further includes calculating (216) an estimated relative velocity of the autonomous vehicle by multiplying the net flow rate and a distance calculated using at least the altitude measurement for the second thermal image and the matched point of interest in the second image. For example, the distance here can be a distance along the optical axis between the camera focal point to intersection of the ground/scene depicted in the camera field of view. Next, the method 200 further includes determining (218) a global reference velocity (e.g., an absolute velocity) of the autonomous vehicle by reorienting the estimated relative velocity of the autonomous vehicle using the roll, pitch, and yaw angle measurements for the second thermal image. In general, the optical flow rate, the net flow rate, and the estimated relative velocity are all referenced to the thermal camera frame corresponding to the first thermal image. As method 200 loops, each updated estimated relative velocity builds on the prior absolute velocity and can be used to generate the current absolute velocity of the unmanned vehicle because the absolute velocity associated with the first thermal image (e.g., in each iteration) is known (or can be estimated using the techniques described herein).

The method 200 further includes calculating (220) a distance traveled by the autonomous vehicle by multiplying the global reference velocity of the autonomous vehicle and a difference between the indication of time for the first thermal image and the second thermal image. The method 200 further includes adjusting (222) a direction/heading of the autonomous vehicle, using the distance traveled by the autonomous vehicle and the destination position, to a course that will reach the destination position.

As illustrated below, the described method may be implemented as a recursive and/or looped process. For example, after running through an initial iteration of the method, a next image is received along with information corresponding to that image. That information can include a roll, pitch, and yaw angle measurements, an indication of time for the third thermal image corresponding to a time that image is taken, and an altitude measurement for the third image.

From each new image received from the camera (as well as the information corresponding to the newly received image), the following steps can be repeated: matching at least one point of interest in the currently received image (i.e., the current image) with at least one point of interest in an image received immediately prior to the current image (i.e., the "previous image") to identify a matched point of interest in the current image; calculating a new optical flow rate using a difference between a position of the at least one point of interest in the previous image and the matched point of interest in the current image; determining a new net flow rate by adjusting the new optical flow rate using a new angular velocity calculated using at least the roll and pitch angle measurements for the previous image and the current image; calculating a new estimated relative velocity of the autonomous vehicle by multiplying the new net flow rate and a new distance calculated using at least the altitude measurements for the current image and the matched point of interest in the current image; determining a new global reference velocity of the autonomous vehicle by reorienting the new estimated relative velocity of the autonomous vehicle using the roll, pitch, and yaw angle measurements for the current image; calculating a new distance traveled by the autonomous vehicle by multiplying the new global reference velocity of the autonomous vehicle and a difference between the indication of time for the previous image and the current image; and adjusting the direction/heading of the autonomous vehicle, using the distance traveled by the autonomous vehicle and the destination position, to a new course that will reach the destination position.

In other words, other than the first and last received image, each image is used twice; once as the above described currently received image, and once as the above described previously received image. There may be some cases in which there are no points of interest that are matched between a current image and a previously received image. In some of these cases, no data would be sent over to the autopilot system. Therefore, the autopilot system would rely on other instruments to "fill in" data needed to determine the global reference velocity of the autonomous vehicle. For instance, the autopilot system can use data from an IMU to estimate velocity of the autonomous vehicle and yaw angle from a magnetometer to determine the global reference velocity of the autonomous vehicle when there are no points of interest that are matched between a current image and a previously received image. In some cases when there are no points of interest that are matched between a current image and a previously received image, a computing system may attempt to find a match between an image before the previous image and the current image. In some cases when there are no points of interest that are matched between a current image and a previously received image, the autopilot system may attempt to find a match between the previous image and the next current image captured by the thermal camera. In some cases when there are no points of interest that are matched between a current image and a previously received image, the autopilot system may estimate a global reference velocity by averaging 1) the last known global reference velocity before no points of interest that are matched between a current image and a previous image and 2) the next calculated global reference velocity after no points of interest that are matched between a current image and a previously received image; and the magnetometer may still be used to determine the yaw angle of the autonomous vehicle. It should be understood that there are many other viable solutions to estimate the global reference velocity when there are no points of interest that are matched between a current image and a previously received image and that any of these solutions may be used as long as they do not depart from the spirit of this invention.

Figure 2B:
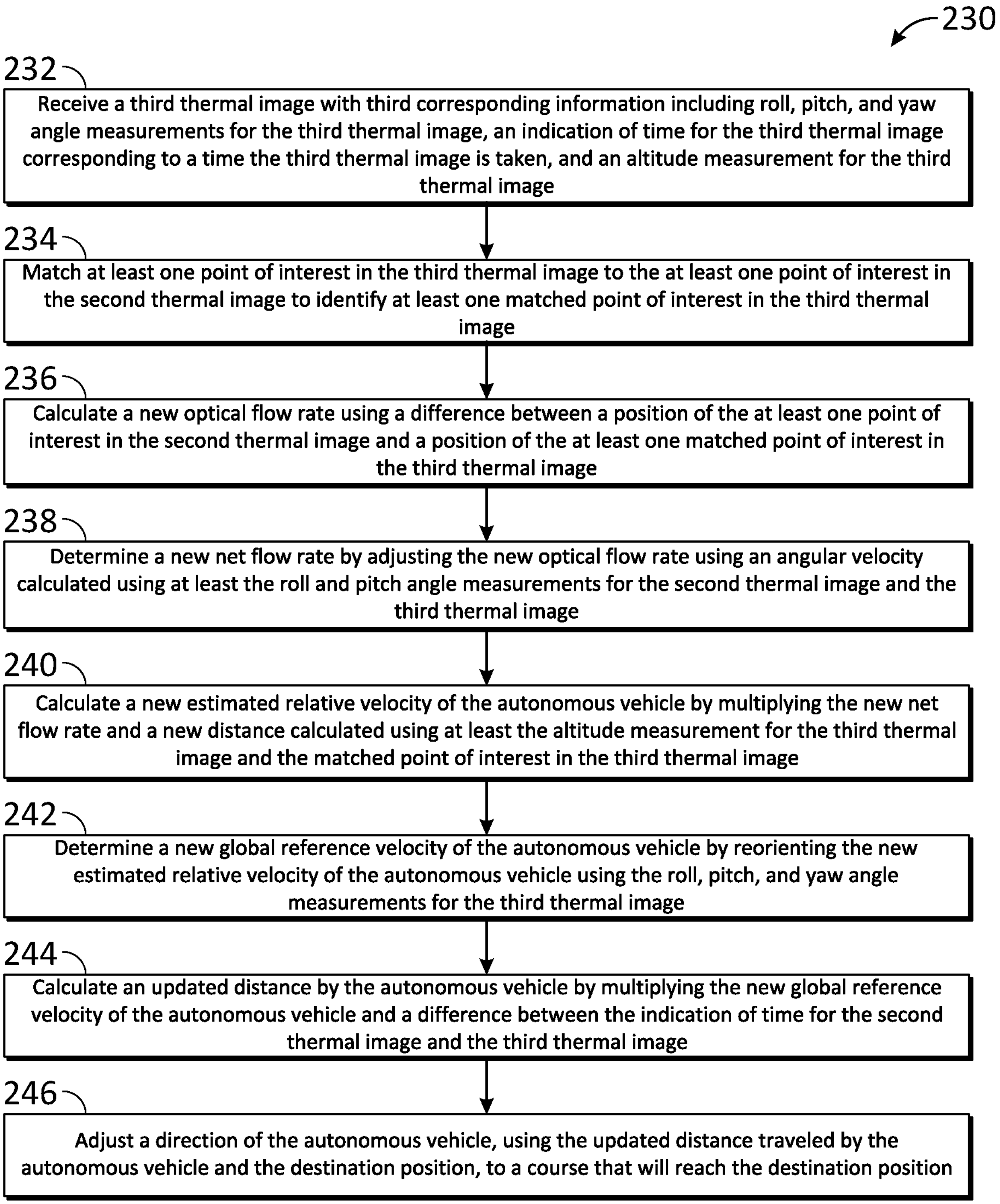
FIG. 2B illustrates a process flow diagram illustrating a recursive/looped portion of the described method for real-time optical odometry navigation in accordance with an embodiment of the disclosure.

In various embodiments, this method may be performed recursively and/or in a loop until the autonomous vehicle reaches the destination position or as long as the autonomous vehicle is used to maintain a desired position. FIG. 2B illustrates a process flow diagram illustrating the recursive and/or looped portion of the described method for real-time optical odometry navigation. The method 230 includes receiving (232) a third thermal image with third corresponding information including roll, pitch, and yaw angle measurements for the third thermal image, an indication of time for the third thermal image corresponding to a time the third thermal image is taken, and an altitude measurement for the third thermal image; matching (234) at least one point of interest in the third thermal image to the at least one point of interest in the second thermal image to identify at least one matched point of interest in the third thermal image; calculating (236) a new optical flow rate using a difference between a position of the at least one point of interest in the second thermal image and a position of the at least one matched point of interest in the third thermal image; determining (238) a new net flow rate by adjusting the new optical flow rate using an angular velocity calculated using at least the roll, pitch, and yaw angle measurements for the second thermal image and the third thermal image; calculating (240) a new estimated relative velocity of the autonomous vehicle by multiplying the new net flow rate and a new distance calculated using at least the altitude measurement for the third thermal image and the matched point of interest in the third thermal image; determining (242) a new global velocity of the autonomous vehicle by reorienting the new estimated relative velocity of the autonomous vehicle using the roll, pitch, and yaw angle measurements for the third thermal image; calculating (244) an updated distance traveled by the autonomous vehicle by multiplying the new global reference velocity of the autonomous vehicle and a difference between the indication of time for the second thermal image and the third thermal image; and adjusting (246) the direction/heading of the autonomous vehicle, using the updated position of and/or distance traveled by the autonomous vehicle and the destination position, to a course configured to reach the destination position.

Figure 3:
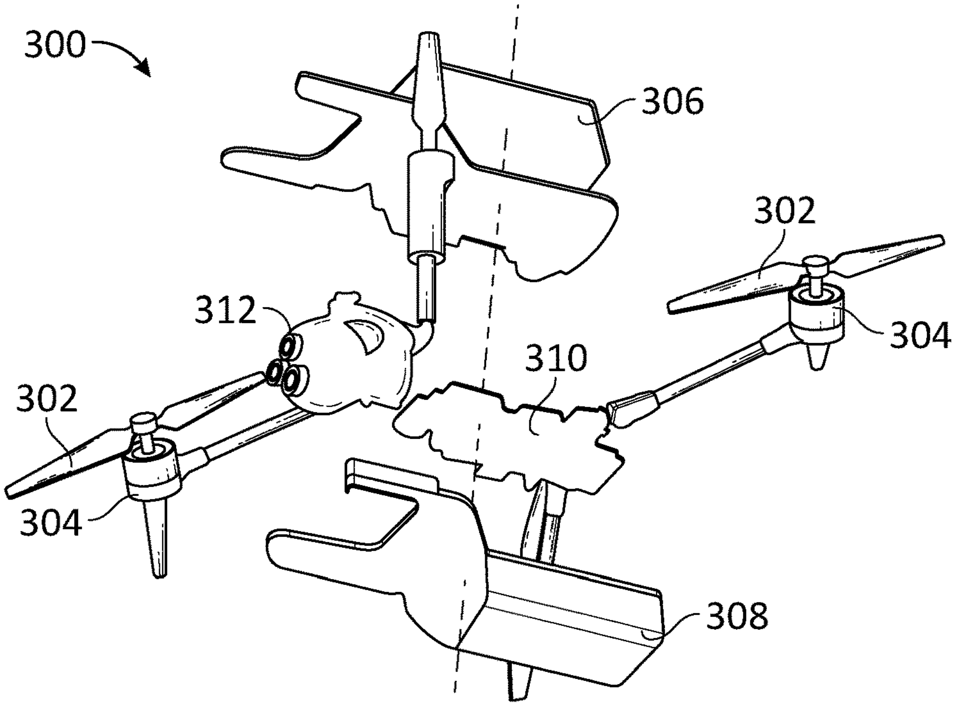
FIG. 3 illustrates an exploded view of an autonomous vehicle equipped to implement real-time optical odometry navigation in accordance with an embodiment of the disclosure.

FIG. 3 illustrates an exploded view of an autonomous vehicle equipped to implement real-time optical odometry navigation. Referring to FIG. 3, the autonomous vehicle 300 includes a plurality of propellers 302 that are powered via motors 304. The autonomous vehicle 300 also includes an upper control unit housing 306 and a lower control unit housing 308 that form together to house the control system 310 and/or embodiments of thermal camera 108 and laser rangefinder 110 of the autonomous vehicle 300. Also shown is video camera/additional imaging equipment 312 (e.g., analogous to additional imaging equipment 112 in FIGS. 1A-E).

Figure 4:
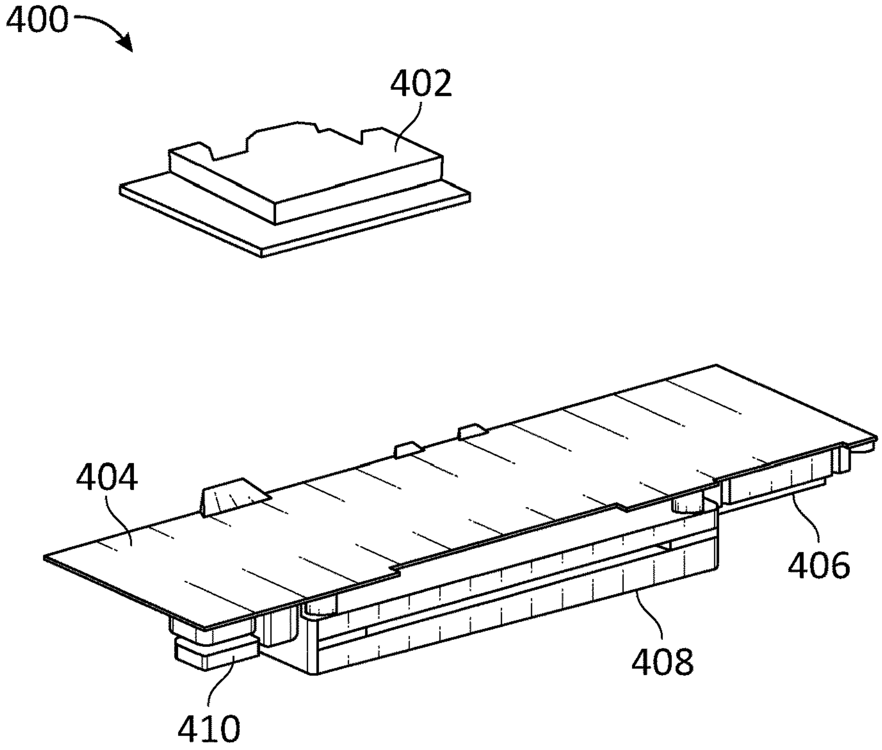
FIG. 4 illustrates an exploded view of an example autonomous vehicle's control system in accordance with an embodiment of the disclosure.

FIG. 4 illustrates an exploded view of an example autonomous vehicle's control system. As can be seen, the example control system 400 includes an autopilot/controller 402, a carrier board 404, a transceiver 406, a computing device/controller 408, and a rangefinder and thermal camera 410. The autopilot 402 contains a software that acts as a flight controller, a microcontroller equipped with motor drivers and sensors designed to instruct the autonomous vehicle regarding how to orientate and control the direction/heading of the autonomous vehicle. In some cases, the autopilot 402 has GPS capabilities that enable it to receive instructions from the flight controller or user to get to a specified destination or maintain a specified position. Specifically, the autopilot 402 can receive an optical flow rate (e.g., from the carrier board 404) and perform the determining (214), calculating (216), determining (218), calculating (220), and adjusting (222) steps of the method 200 described in FIG. 2A.

Figure 5:
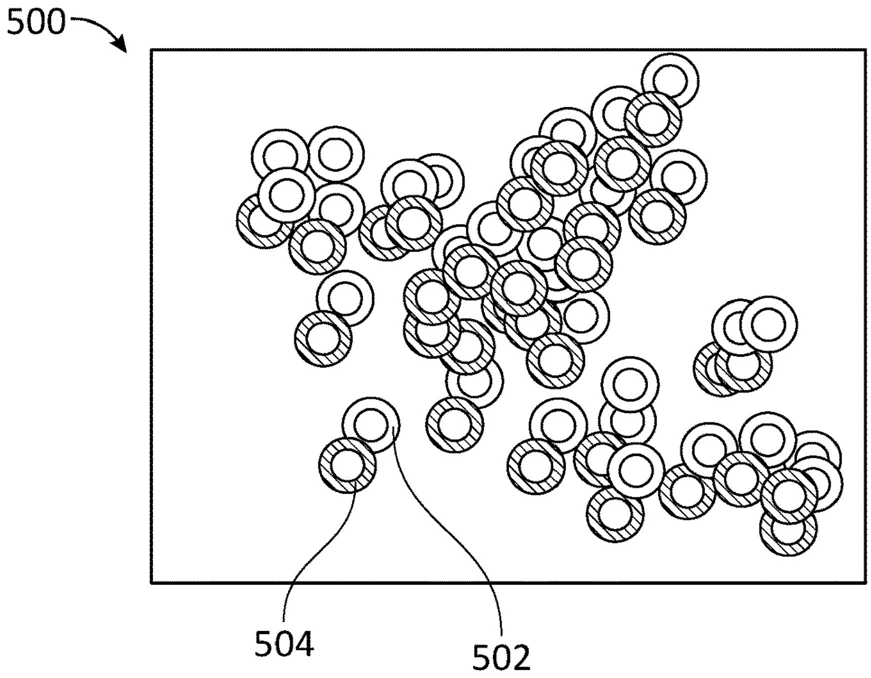
FIG. 5 illustrates a thermal image in which a detection algorithm has been run to identify matched sets of points in accordance with an embodiment of the disclosure.

The carrier board 404 connects/allows communication between the computing device 408, the autopilot 402, and other sensors including the rangefinder and Lepton 410. The transceiver 406 allows ethernet and serial digital data communication by providing the appropriate bandwidth and range for wireless video and telemetry communications. In some cases, the transceiver 406 enables camera information (e.g., audio, pictures, and/or video) from the additional imaging equipment to be sent to an offsite location, such as a base station, as described herein. The computing device 408 may provide processing power for the autonomous vehicle. Specifically, as used in this application, the computing device 408 can be used to match the points of interests in the captured thermal images as well as calculate the optical flow rates for each thermal image (e.g., the receiving (204), identifying (206), receiving (208), matching (210), and calculating (212) steps of the method 200 described in FIG. 2A and as illustrated in FIG. 5. The computing device 408 can then send the calculated optical flow rate (along with any other needed information), via the carrier board 404, to the autopilot 402 to perform the rest of the method 200 described in FIG. 2A. The rangefinder and Lepton (e.g., thermal camera) 410 can be the rangefinder 110 and thermal camera 108 described with respect to FIG. 1.

FIG. 5 illustrates a thermal image in which a detection algorithm has been run to identify matched sets of points. Referring to FIG. 5, the thermal image 500 contains a plurality of recognized points 502 corresponding to points recognized in a first thermal image (not shown). The thermal image 500 also contains a plurality of matched points 504. As can be seen, this thermal image 500 illustrates the matching (210) step of FIG. 2A. The difference in position of the matched points 504 and the recognized points 502 represent the movement of an autonomous vehicle (prior to taking into account any angular movement of the thermal camera itself), which is described in the calculating (212) step of FIG. 2A.

As described herein, a method for controlling an autonomous vehicle may include any combination of the following: receiving a destination position; receiving a first thermal image with first corresponding information comprising roll, pitch, and yaw angle measurements for the first thermal image, an indication of time for the first thermal image corresponding to a time the first thermal image is taken, and an altitude measurement for the first thermal image; identifying at least one point of interest in the first thermal image; receiving a second thermal image with second corresponding information comprising roll, pitch, and yaw angle measurements for the second thermal image, an indication of time for the second thermal image corresponding to a time the second thermal image is taken, and an altitude measurement for the second thermal image; matching at least one point of interest in the second thermal image to the at least one point of interest in the first thermal image to identify at least one matched point of interest in the second thermal image; calculating an optical flow rate using a difference between a position of the at least one point of interest in the first thermal image and a position of the at least one matched point of interest in the second thermal image; determining a net flow rate by adjusting the optical flow rate using an angular velocity calculated using at least the roll and pitch angle measurements for the first thermal image and the second thermal image; calculating an estimated relative velocity of the autonomous vehicle by multiplying the net flow rate and a distance calculated using at least the altitude measurement for the second thermal image and the matched point of interest in the second thermal image; determining a global reference velocity of the autonomous vehicle by reorienting the estimated relative velocity of the autonomous vehicle using the roll, pitch, and yaw angle measurements for the second thermal image; calculating a distance traveled by the autonomous vehicle by multiplying the global reference velocity of the autonomous vehicle and a difference between the indication of time for the first thermal image and the second thermal image; and adjusting a direction/heading of the autonomous vehicle, using the distance traveled by the autonomous vehicle and the destination position, to a course that will reach the destination position.

In some embodiments, the method may include any one or combination of the following: receiving a third thermal image with third corresponding information comprising roll, pitch, and yaw angle measurements for the third thermal image, an indication of time for the third thermal image corresponding to a time the third thermal image is taken, and an altitude measurement for the third thermal image; matching at least one point of interest in the third thermal image to at least one point of interest in the second thermal image to identify a matched point of interest in the third thermal image; calculating a new optical flow rate using a difference between a position of the at least one point of interest in the second thermal image and a position of the matched point of interest in the third thermal image; determining a new net flow rate by adjusting the new optical flow using an angular velocity calculated using at least the roll and pitch angle measurements for the second thermal image and the third thermal image; calculating a new estimated relative velocity of the autonomous vehicle by multiplying the new net flow rate and a new distance calculated using at least the altitude measurement for the third thermal image and the matched point of interest in the third thermal image; determining a new global reference velocity of the autonomous vehicle by reorienting the new estimated relative velocity of the autonomous vehicle using the roll, pitch, and yaw angle measurements for the third thermal image; calculating an updated distance traveled by the autonomous vehicle by multiplying the new global reference velocity of the autonomous vehicle and a difference between the indication of time for the second thermal image and the third thermal image; and adjusting the direction/heading of the autonomous vehicle, using the updated distance traveled by the autonomous vehicle and the destination position, to the course that will reach the destination position. In various embodiments, the method may include successively repeating any one or combination of the steps described herein, employing any number of thermal images, until a destination position is reached.

In another embodiments, a method for controlling an autonomous vehicle includes receiving a destination position, a first thermal image with first corresponding information, and a second thermal image with second corresponding information; matching at least one point of interest in the second thermal image to the at least one point of interest in the first thermal image; calculating an optical flow rate using a difference between a position of the at least one point of interest in the first thermal image and a position of the at least one matched point of interest in the second thermal image; determining a net flow rate by adjusting the optical flow rate using an angular velocity; calculating an estimated velocity of the autonomous vehicle by multiplying the net flow rate and a calculated distance; determining a global reference velocity of the autonomous vehicle by using the roll, pitch, and yaw angle measurements for the second thermal image; calculating a distance traveled by the autonomous vehicle by multiplying the global reference velocity of the autonomous vehicle and a difference of time for the first and second thermal image; and adjusting a direction/heading of the autonomous vehicle to a course that will reach the destination position.

Embodiments of the described systems and methods for real-time optical odometry navigation may be implemented as a computer process, a computing system, or as an article of manufacture, such as a computer program product or computer-readable medium. Certain methods and processes described herein can be embodied as software, code and/or data, which may be stored on one or more storage media. Certain embodiments of the invention contemplate the use of a machine in the form of a computer system within which a set of instructions, when executed, can cause the system to perform any one or more of the methodologies discussed above. Certain computer program products may be one or more computer-readable storage media readable by a computer system and encoding a computer program of instructions for executing a computer process. As used herein, in no case does the term "storage media" consist of transitory propagating signals.

By way of example, and not limitation, computer-readable storage media may include volatile and non-volatile memory, removable and non-removable media implemented in any method or technology for storage of information such as computer-readable instructions, data structures, program modules or other data. For example, a computer-readable storage medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); or other media now known or later developed that is capable of storing computer-readable information/data for use by a computer system. "Computer-readable storage media" should not be construed or interpreted to include transitory media such as propagating signals.

Alternatively, or in addition, the functionality, methods, and processes described herein can be implemented, at least in part, by one or more hardware modules (or logic components). For example, the hardware modules can include, but are not limited to, application-specific integrated circuit (ASIC) chips, field programmable gate arrays (FPGAs), system-on-a-chip (SoC) systems, complex programmable logic devices (CPLDs) and other programmable logic devices now known or later developed. When the hardware modules are activated, the hardware modules perform the functionality, methods and processes included within the hardware modules.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

More generally, in various embodiments, two thermal images may be compared to each other in order to extract the relative position of the thermal camera itself within a global coordinate system. However, if the velocity of the thermal camera is already known using other means (e.g., such as through use of a separate thermal camera aimed in a different direction), embodiments can also be used to back out the depth of objects/points of interest within the field of view. In addition, with a stereo thermal camera system (two or more thermal cameras with overlapping fields of view), the standoff distances of objects within the overlapping fields of view may be determined directly without the need of a ranging sensor system or other external information, in addition to determining the relative positioning of the thermal cameras within the global coordinate system (e.g., using the methods described herein).

To determine position information of the thermal camera or for depth reconstruction, feature points within the thermal images are matched. In this context, feature points are distinct features that can be uniquely identified within the thermal image itself. The matching of these feature points can be performed via computer vision feature point identification and matching algorithms such as Kanade-Lucas-Tomasi (KLT) optical flow, scale invariant feature transform (SIFT), and speeded-up robust features (SURF) based algorithms and/or related optical flow algorithms, among others. An example image of feature matching is shown in FIG. 5. The black circles are the locations of the matched feature points within the image, while the white circles are the location of the same feature points in the previous image. The average pixel displacement between all the matched feature points can be used to determine location of the thermal camera or the depth of the feature points within the thermal images.

To determine the velocity and position of a thermal camera in a global coordinate system, the pixel displacement is the change in coordinates of a feature point in consecutive images and n is the standoff distance between the thermal camera and the scene imaged by the thermal camera, which can typically be measured or estimated with a laser rangefinder, a LiDAR system, a radar system, and/or other ranging sensor systems, as described herein.

Figure 6:
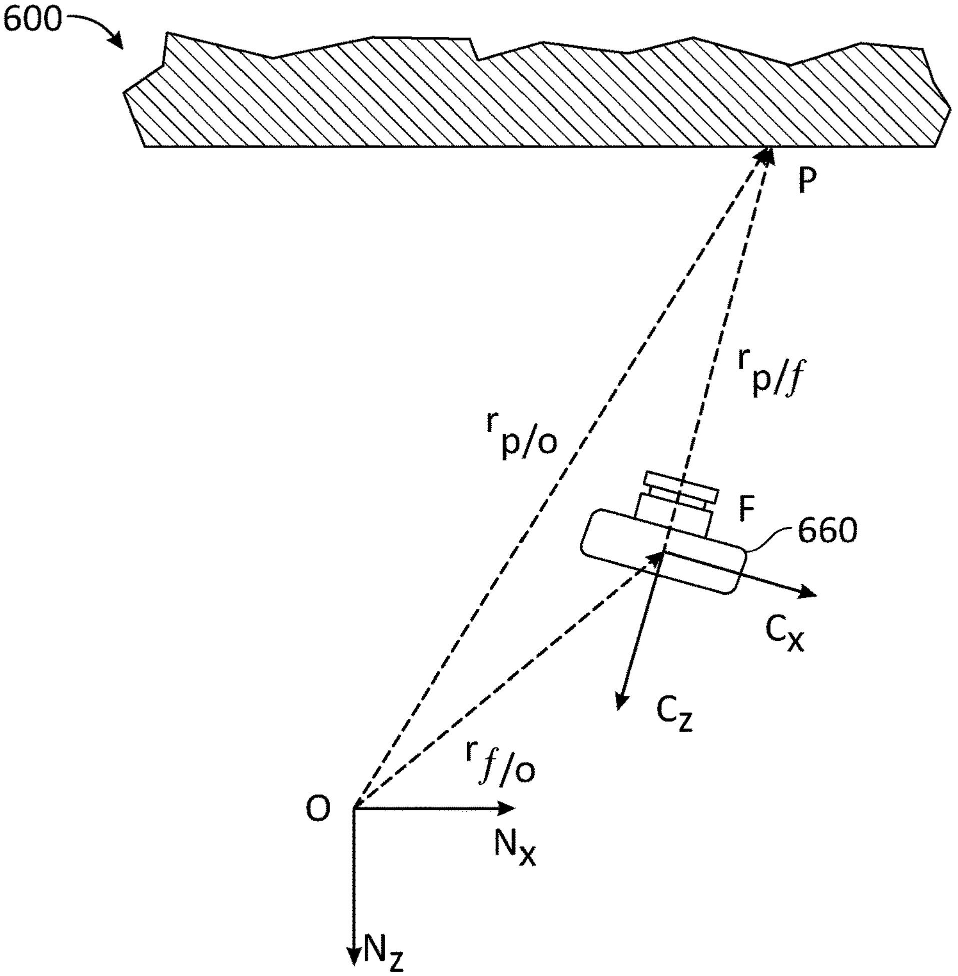
FIG. 6 illustrates a relationship between a thermal camera focal point, a global origin, and an optical axis projection onto a surface, in accordance with an embodiment of the disclosure.

To determine the global positioning of the aircraft from rangefinder data and optical flow measurements, kinematic equations convert these quantities to velocities in a global reference frame. These global velocities can then be integrated into a relative position vector utilizing a position based visual servo control algorithm. In these kinematic equations, the global reference frame is defined as {Nx, Ny, Nz}, and the body fixed coordinate system of the thermal camera and the airframe is defined as {Cx, Cy, Cz}. The location of the origin of the global reference frame is defined as O, the location of the focal point of the optical flow thermal camera is defined as F, and the intersection of the optical axis of the optical flow thermal camera with the scene to be tracked is defined as P, as shown in operational scene 600 of FIG. 6 including thermal imaging odometry system (TIOS) 660 (e.g., an embodiment of the thermal camera 108 and/or laser rangefinder 110).

The relationship between the three points are defined in Equation (1) where the location of point f in the global horizontal plane defined by Nx×Ny is formulated:

$$r_{p/o} = r_{f/o} + r_{p/f} \tag{1}$$

rp/f can be determined using the standoff distance calculated from a combination of the rangefinder and the aircraft inertial navigation system (INS) while the velocity of P with respect to O can be related to the optical flow measurements.

Solving for rf/o results in Equation (2). The vector rf/o represents the location of the aircraft in the global reference frame:

$$r_{f/o} = r_{p/o} - r_{p/f} \tag{2}$$

By taking the time derivative of Equation (2) and applying the transport theorem, Equation (3) is obtained, which relates the velocity of the feature points and gyro measurement ${}^{N}W^{C}$ to the global/absolute velocity. By getting the equation into the velocity domain, velocity estimates from the optical flow sensor may be used to describe the velocity of the aircraft in the global frame, which can then be integrated for position:

$$v^{N}_{f/o} = v^{N}_{p/o} - \left(v^{C}_{p/f} + {}^{N}w^{C} \times r_{p/f}\right) \tag{3}$$

Since feature points are assumed to be stationary, they have a zero velocity with respect to the origin of the global reference frame, which is represented as $$v^{N}_{p/o}$$

in Equation (3). In addition, in some embodiments, an average velocity of all the feature points within the field of view of the thermal camera may be calculated, and it may be assumed that the average velocity is being measured at where the thermal camera's optical axis intersects the scene. With these assumptions, Equation (3) may be simplified into Equation (4):

$$v^{N}_{p^{r}/p} = -v^{C}_{p/f} - {}^{N}w^{C} \times r_{p/f} \tag{4}$$

Figure 7:
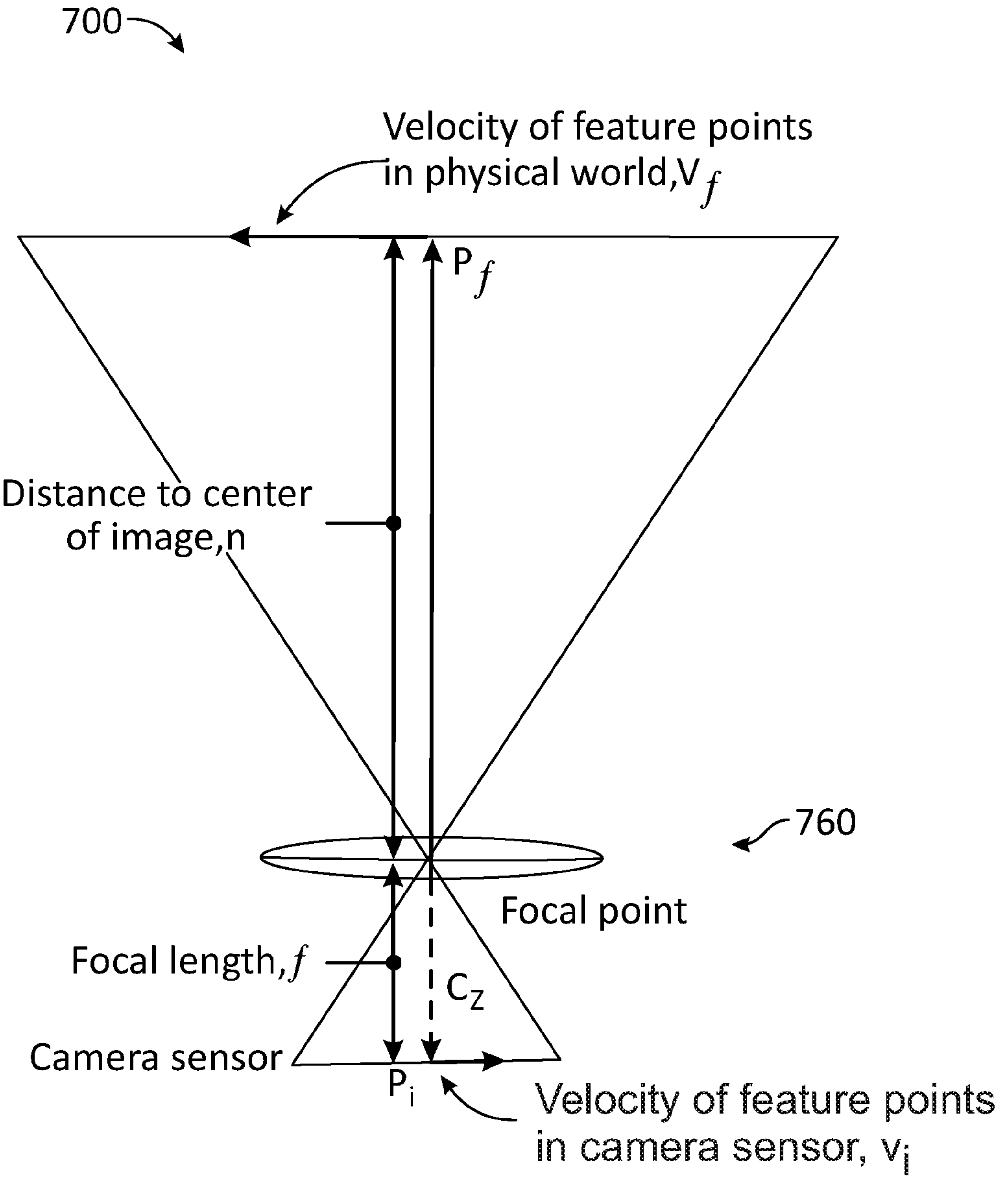
FIG. 7 illustrates a pinhole model of a thermal camera used for optical flow derivation in accordance with an embodiment of the disclosure.

The feature point velocity is computed in the pixel space of the thermal camera. To relate these velocities to the global reference frame, a pinhole model of the thermal camera is used, as shown in operational scene 700 of FIG. 7 including TIOS 760 in FIG. 7. Using this model, the position of a pixel point to the physical world may be related via Equation (5):

$$P_i\left(\frac{n}{f}\right) = P_f \tag{5}$$

Here, Pf represents the coordinates of the feature point in the thermal camera reference frame, Pi is the location of the corresponding feature point in the image reference frame, n is the normal distance from the optical axis to the feature point, and f is the focal length. The time derivative of Equation (5) provides the velocity of the feature point in the thermal camera frame. Once the derivative is taken, the equation can further be simplified since the focal length does not change with time (for fixed focal length thermal cameras) and the velocities of the feature points may be averaged at the center of the image, resulting in Equation (6):

$$v_i\left(\frac{n}{f}\right) = v_f = -v^{C}_{p/f} \tag{6}$$

In various embodiments, the expression "${}^{N}W^{C}$" may be determined by sensor data obtained directly from a gyroscope in the form of Equation (7):

$${}^{N}w^{C} = -g_x C_x - g_y C_y - g_z C_z \tag{7}$$

Substituting Equations (7) and (6) into Equation (4), the global velocity may be determined in terms of the average pixel velocities and information from the gyros as shown in Equation (8). Equation (8) can then be integrated with time to determine position:

$$v^{N}_{f/o} = \left(\frac{v_{iy}}{f} - g_y\right) n C_x + \left(\frac{v_{ix}}{f} - g_x\right) n C_y \tag{8}$$

As shown from the above derivation, by knowing the relative pixel displacements, both position and velocity of the thermal camera relative to the surface (e.g., ground, wall, ceiling) may be determined. In the derivation, a rangefinder may be used to determine the standoff distance between the thermal camera and the scene. Examples of rangefinders include laser, radar, and/or sonar based ranging sensor systems. More advanced sensors can be used such as two and three-dimensional radar and/or LiDAR as these would produce a two and three-dimensional depth map of the scene thus allowing for a more accurate velocity estimate as each individual standoff distance is known (e.g., based, at least in part, on a fixed relative position and pose between the ranging sensor system and the thermal camera).

If the velocity of the thermal camera is already known, such as utilizing an INS system, the standoff distances of the various stationary feature points may be determined via Equation 8.

If the pixel velocity of the feature points ($V_{ix}$ and $V_{iy}$), the focal length of the thermal camera f, and the rotation rate of the thermal camera (can be directly computed using a gyrometer) ($g_x$ and $g_y$) are known, n, the standoff distance of the feature point relative to the thermal camera, can be determined directly as shown in Equations 9 and 10. The standoff distances of these feature points may then be used to reconstruct the depth across the field of view.

$$\frac{v^{N}_{f/ox}}{\frac{v_{iy}}{f} - g_y} = n \tag{9}$$

$$\frac{v^{N}_{f/oy}}{\frac{v_{ix}}{f} - g_x} = n \tag{10}$$

Figure 8:
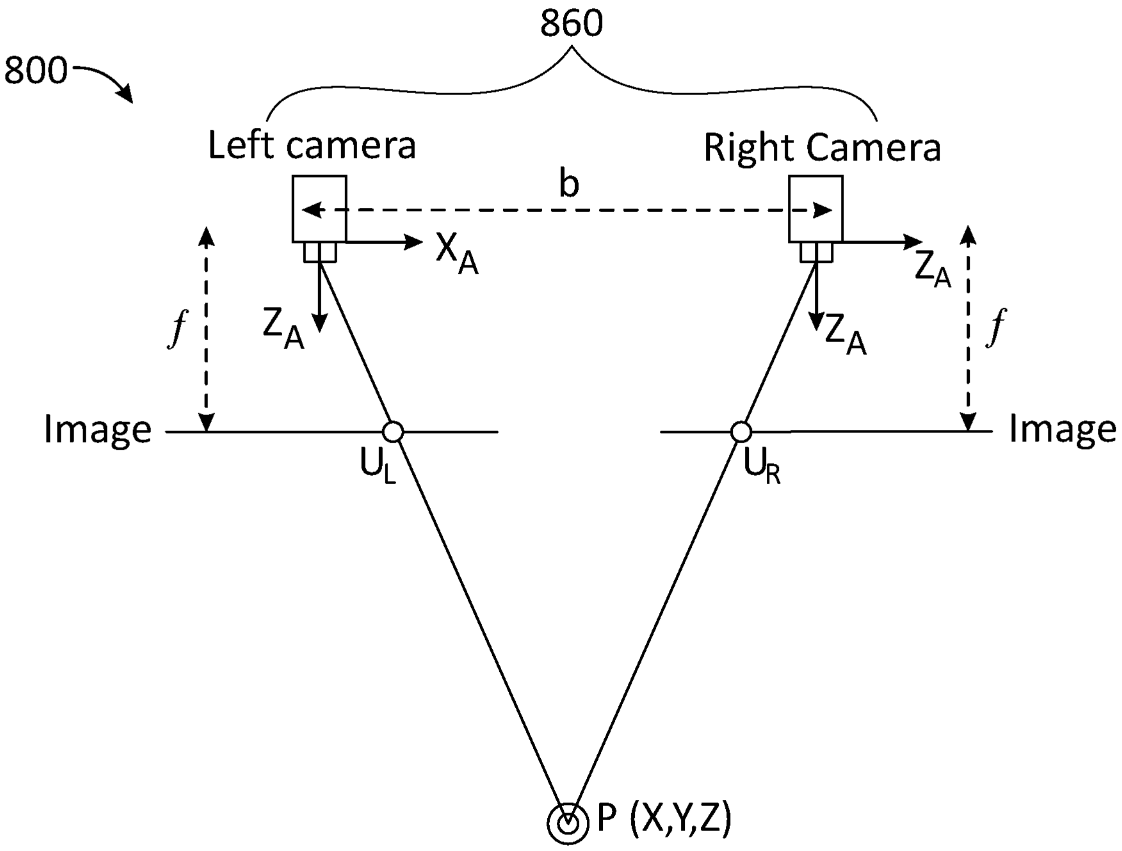
FIG. 8 illustrates a thermal stereovision system used for depth reconstruction in accordance with an embodiment of the disclosure.

Stereo thermal cameras can be used to directly determine depth by using feature matching as well as via existing methodologies used for visible spectrum cameras. To calculate this, feature points are matched between images captured simultaneously by two thermal cameras of a stereo vision system characterized, at least in part, by an intra-axial distance between the two thermal cameras (same applies for any number of thermal cameras above 2). Once a feature is identified as a match, the relative angle of the ray the feature point is located on (this can be computed using the pixel location of the feature point and physical parameters of the stereo vision thermal cameras, including the intra-axial distance b in FIG. 8) is computed for each individual thermal camera and the intersection of these rays can give the location of the feature point in 3D space, as shown in operational scene 800 of FIG. 8 including TIOS 860 in FIG. 7. In various embodiments, such stereo vision system does not require a ranging sensor system in order to perform method 200; the standoff distance and/or other depth measurements are provided by processing the stereo thermal imagery as shown. This process can also be used in conjunction with depth information from a ranging sensor system, as described herein, including radar, LiDAR, etc. to give a more robust solution through data fusion, where range estimates from different systems are statistically combined to generate a more precise fused range estimate.

Figure 9:
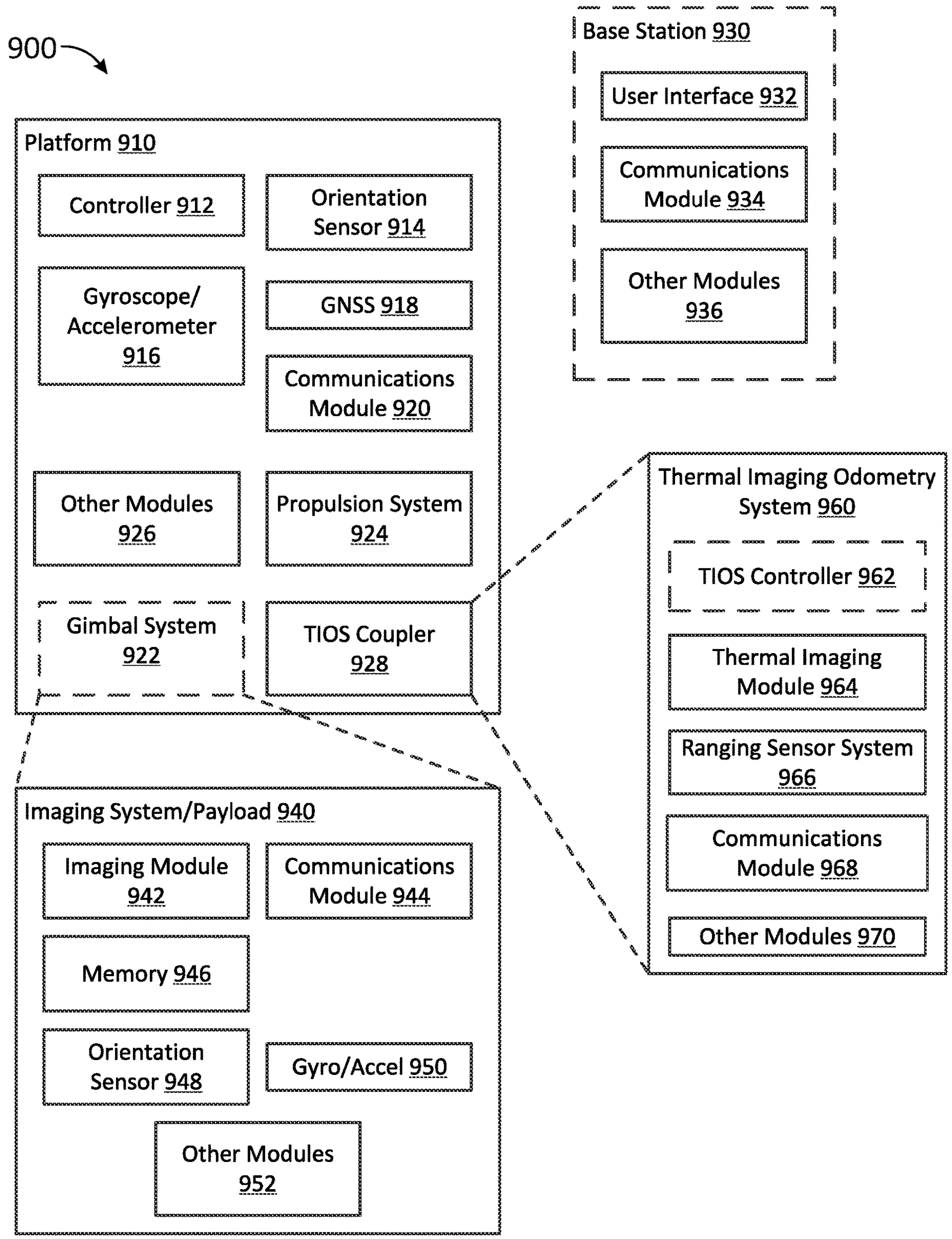
FIG. 9 illustrates a block diagram of an unmanned aircraft system (UAS) including an unmanned aerial vehicle (UAV) with a thermal imaging odometry system (TIOS) in accordance with an embodiment of the disclosure.

FIG. 9 illustrates a block diagram of an unmanned aircraft system (UAS) 900 including an unmanned aerial vehicle (UAV) platform 910 with a thermal imaging odometry system (TIOS) 960 in accordance with an embodiment of the disclosure. In various embodiments, TIOS 960 may be implemented and/or configured to operate similarly to thermal camera 108 and a laser rangefinder 110 of FIGS. 1A-E, TIOS 660 of FIG. 6, TIOS 760 of FIG. 7, TIOS 860 of FIG. 8, and/or as referenced in methods 200 and 230 of FIGS. 2A-B.

In some embodiments, system 900 may be configured to fly over a scene, through a structure, or approach a target and image or sense the scene, structure, or target, or portions thereof, using gimbal system 922 to aim imaging system/sensor payload 940 at the scene, structure, or target, or portions thereof. Resulting imagery and/or other sensor data may be processed (e.g., by sensor payload 940, platform 910, and/or base station 930) and displayed to a user through use of user interface 932 (e.g., one or more displays such as a multi-function display (MFD), a portable electronic device such as a tablet, laptop, or smart phone, or other appropriate interface) and/or stored in memory for later viewing and/or analysis.

In various embodiments, system 900 may be configured to use such imagery and/or sensor data to control operation of platform 910 and/or sensor payload 940, as described herein, such as controlling gimbal system 922 to aim sensor payload 940 towards a particular direction or controlling propulsion system 924 to move platform 910 to a desired position in a scene or structure or relative to a target. In related embodiments, system 900 may be configured to deliver or drop a package. (e.g., payload 940) at a desired location or structure or relative to a target. In all operational embodiments, system 900 may be configured to use TIOS 960 to determine a velocity and/or position of platform 910, for example, such as while traversing a GPS/GNSS-denied area, and/or to determine a depth map corresponding to a field of view of TIOS 960, as described herein.

In the embodiment shown in FIG. 9, UAS 900 includes platform 910, optional base station 930, and at least one TIOS 960. In general, platform 910 may be a mobile platform configured to move or fly and position payload 940 and/or platform 910 (e.g., relative to a designated or detected target). As shown in FIG. 9, platform 910 may include one or more of a controller 912, an orientation sensor 914, a gyroscope/accelerometer 916, a global navigation satellite system (GNSS) 918, a communications module 920, a gimbal system 922, a propulsion system 924, a TIOS coupler 928, and other modules 926. Sensor payload 940 and/or TIOS 960 may be physically coupled to platform 910 and be configured to capture sensor data (e.g., visible spectrum images, infrared or thermal images, narrow aperture radar data, analyte sensor data, orientation/attitude and/or position data, and/or other sensor data) of a target position, area, and/or object(s) as selected and/or framed by operation of platform 910 and/or base station 930, for example, and/or associated with maneuvering or navigation of platform 910, as described herein.

Operation of platform 910 may be substantially autonomous and/or partially or completely controlled by optional base station 930, which may include one or more of a user interface 932, a communications module 934, and other modules 936. In other embodiments, platform 910 may include one or more of the elements of base station 930, such as with various types of manned aircraft, terrestrial vehicles, and/or surface or subsurface watercraft. In some embodiments, one or more of the elements of system 900 may be implemented in a combined housing or structure that can be coupled to or within platform 910 and/or held or carried by a user of system 900.

Controller 912 may be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of platform 910 and/or other elements of system 900, for example. Such software instructions may also implement methods for processing infrared images and/or other sensor signals, determining sensor information, providing user feedback (e.g., through user interface 932), querying devices for operational parameters, selecting operational parameters for devices, or performing any of the various operations described herein (e.g., operations performed by logic devices of various devices of system 900).

In addition, a non-transitory medium may be provided for storing machine readable instructions for loading into and execution by controller 912. In these and other embodiments, controller 912 may be implemented with other components where appropriate, such as volatile memory, non-volatile memory, one or more interfaces, and/or various analog and/or digital components for interfacing with devices of system 900. For example, controller 912 may be adapted to store sensor signals, sensor information, parameters for coordinate frame transformations, calibration parameters, sets of calibration points, and/or other operational parameters, over time, for example, and provide such stored data to a user using user interface 932. In some embodiments, controller 912 may be integrated with one or more other elements of platform 910, for example, or distributed as multiple logic devices within platform 910, base station 930, and/or sensor payload 940.

In some embodiments, controller 912 may be configured to substantially continuously monitor and/or store the status of and/or sensor data provided by one or more elements of platform 910, sensor payload 940, TIOS 960, and/or base station 930, such as the position and/or orientation of platform 910, sensor payload 940, and/or base station 930, for example, and the status of a communication link established between platform 910, sensor payload 940, TIOS 960, and/or base station 930. Such communication links may be configured to be established and then used to transmit data between elements of system 900 substantially continuously throughout operation of system 900, where such data includes various types of sensor data, control parameters, and/or other data.

Orientation sensor 914 may be implemented as one or more of a compass, float, accelerometer, magnetometer, and/or other device capable of measuring an orientation of platform 910 (e.g., magnitude and direction of roll, pitch, and/or yaw, relative to one or more reference orientations such as gravity and/or Magnetic North), optional gimbal system 922, imaging system/sensor payload 940, and/or other elements of system 900, and providing such measurements as sensor signals and/or data that may be communicated to various devices of system 900. Gyroscope/accelerometer 916 may be implemented as one or more electronic sextants, semiconductor devices, integrated chips, accelerometer sensors, accelerometer sensor systems, or other devices capable of measuring angular velocities/accelerations and/or linear accelerations (e.g., direction and magnitude) of platform 910 and/or other elements of system 900 and providing such measurements as sensor signals and/or data that may be communicated to other devices of system 900 (e.g., user interface 932, controller 912).

GNSS 918 may be implemented according to any global navigation satellite system, including a GPS, GLONASS, and/or Galileo based receiver and/or other device capable of determining absolute and/or relative position of platform 910 (e.g., or an element of platform 910) based on wireless signals received from space-born and/or terrestrial sources (e.g., eLoran, and/or other at least partially terrestrial systems), for example, and capable of providing such measurements as sensor signals and/or data (e.g., coordinates) that may be communicated to various devices of system 900. In some embodiments, GNSS 918 may include an altimeter, for example, or may be used to provide an absolute altitude.

Communications module 920 may be implemented as any wired and/or wireless communications module configured to transmit and receive analog and/or digital signals between elements of system 900. For example, communications module 920 may be configured to receive flight control signals and/or data from base station 930 and provide them to controller 912 and/or propulsion system 924. In other embodiments, communications module 920 may be configured to receive images and/or other sensor information (e.g., visible spectrum and/or infrared/thermal still images or video images) from sensor payload 940 and relay the sensor data to controller 912 and/or base station 930. In further embodiments, communications module 920 may be configured to receive sensor information and/or control parameters from TIOS 960 and relay the sensor data to controller 912 and/or base station 930. In various embodiments, communications module 920 may be configured to support spread spectrum transmissions, for example, and/or multiple simultaneous communications channels between elements of system 900. Wireless communication links may include one or more analog and/or digital radio communication links, such as WiFi and others, as described herein, and may be direct communication links established between elements of system 900, for example, or may be relayed through one or more wireless relay stations configured to receive and retransmit wireless communications.

In some embodiments, communications module 920 may be configured to monitor the status of a communication link established between platform 910, sensor payload 940, and/or base station 930. Such status information may be provided to controller 912, for example, or transmitted to other elements of system 900 for monitoring, storage, or further processing, as described herein. Communication links established by communication module 920 may be configured to transmit data between elements of system 900 substantially continuously throughout operation of system 900, where such data includes various types of sensor data, control parameters, and/or other data, as described herein.

In some embodiments, when present, optional gimbal system 922 may be implemented as an actuated gimbal mount, for example, that may be controlled by controller 912 to stabilize sensor payload 940 relative to a target or to aim and/or orient sensor payload 940 according to a desired direction and/or relative position. As such, gimbal system 922 may be configured to provide a relative orientation of sensor payload 940 (e.g., relative to an orientation of platform 910) to controller 912 and/or communications module 920 (e.g., gimbal system 922 may include its own orientation sensor 914). In other embodiments, gimbal system 922 may be implemented as a gravity driven mount (e.g., non-actuated). In various embodiments, gimbal system 922 may be configured to provide power, support wired communications, and/or otherwise facilitate operation of articulated sensor/sensor payload 940. In further embodiments, gimbal system 922 may be configured to couple to a laser pointer, rangefinder, and/or other device, for example, to support, stabilize, power, and/or aim multiple devices (e.g., sensor payload 940 and one or more other devices) substantially simultaneously. In still further embodiments, gimbal system 922 may be implemented as an actuated release mechanism to decouple and/or drop payload 940 according to control signals provided by controller 912 and/or relayed by communications module 920.

Propulsion system 924 may be implemented as one or more propellers, turbines, or other thrust-based propulsion systems, and/or other types of propulsion systems that can be used to provide motive force and/or lift to platform 910 and/or to steer platform 910. In some embodiments, propulsion system 924 may include multiple propellers (e.g., a tri, quad, hex, oct, or other type "copter") that can be controlled (e.g., by controller 912) to provide lift and motion for platform 910 and to provide an orientation for platform 910. In other embodiments, propulsion system 924 may be configured primarily to provide thrust while other structures of platform 910 provide lift, such as in a fixed wing embodiment (e.g., where wings provide the lift) and/or an aerostat embodiment (e.g., balloons, airships, hybrid aerostats). In various embodiments, propulsion system 924 may be implemented with a portable power supply, such as a battery and/or a combustion engine/generator and fuel supply.

Other modules 926 may include other and/or additional sensors, actuators, communications modules/nodes, and/or user interface devices, for example, and may be used to provide additional environmental information related to operation of platform 910, for example.

In some embodiments, other modules 926 may include a humidity sensor, a wind and/or water temperature sensor, a barometer, an altimeter, a radar system, a proximity sensor, a visible spectrum camera or infrared or thermal camera (with an additional mount), an irradiance detector, and/or other environmental sensors providing measurements and/or other sensor signals that can be displayed to a user and/or used by other devices of system 900 (e.g., controller 912) to provide operational control of platform 910 and/or system 900.

In some embodiments, other modules 926 may include one or more actuated and/or articulated devices (e.g., multi-spectrum active illuminators, visible and/or IR cameras, radars, sonars, and/or other actuated devices) coupled to platform 910, where each actuated device includes one or more actuators adapted to adjust an orientation of the device, relative to platform 910, in response to one or more control signals (e.g., provided by controller 912). In particular, other modules 926 may include a stereo vision system configured to provide image data that may be used to calculate or estimate a position of platform 910, for example, or to calculate or estimate a relative position of a navigational hazard in proximity to platform 910. In various embodiments, controller 130 may be configured to use such proximity and/or position information to help safely pilot platform 910 and/or monitor communication link quality, as described herein.

In various embodiments, TIOS coupler 928 may be implemented as a slot-slide mount, a latching mechanism, and/or other coupler that may be permanently mounted to platform 910 to provide a mounting position and/or orientation for TIOS 960 relative to a center of gravity of platform 910, relative to propulsion system 924, and/or relative to other elements of and/or orientations associated with platform 910. In addition, TIOS coupler 928 may be configured to provide power, support wired communications, and/or otherwise facilitate operation of TIOS 960, as described herein. As such, TIOS coupler 928 may be configured to provide a power, telemetry, and/or other sensor or control data interface between platform 910 and TIOS 960.

User interface 932 of base station 930 may be implemented as one or more of a display, a touch screen, a keyboard, a mouse, a joystick, a knob, a steering wheel, a yoke, and/or any other device capable of accepting user input and/or providing feedback to a user. In various embodiments, user interface 932 may be adapted to provide user input (e.g., as a type of signal and/or sensor information transmitted by communications module 934 of base station 930) to other devices of system 900, such as controller 912. User interface 932 may also be implemented with one or more logic devices (e.g., similar to controller 912) that may be adapted to store and/or execute instructions, such as software instructions, implementing any of the various processes and/or methods described herein. For example, user interface 932 may be adapted to form communication links, transmit and/or receive communications (e.g., visible spectrum and/or infrared images and/or other sensor signals, control signals, sensor information, user input, and/or other information), for example, or to perform various other processes and/or methods described herein.

In one embodiment, user interface 932 may be adapted to display a time series of various sensor information and/or other parameters as part of or overlaid on a graph or map, which may be referenced to a position and/or orientation of platform 910 and/or other elements of system 900. For example, user interface 932 may be adapted to display a time series of positions, headings, and/or orientations of platform 910 and/or other elements of system 900 overlaid on a geographical map, which may include one or more graphs indicating a corresponding time series of actuator control signals, sensor information, and/or other sensor and/or control signals.

In some embodiments, user interface 932 may be adapted to accept user input including a user-defined target heading, waypoint, route, and/or orientation for an element of system 900, for example, and to generate control signals to cause platform 910 to move according to the target heading, route, and/or orientation, or to aim sensor payload 940 accordingly. In other embodiments, user interface 932 may be adapted to accept user input modifying a control loop parameter of controller 912, for example. In further embodiments, user interface 932 may be adapted to accept user input including a user-defined target attitude, orientation, position, and/or course for platform 910 and/or an actuated or articulated device (e.g., sensor payload 940) associated with platform 910, for example, and to generate control signals for adjusting an orientation and/or position of platform 910 and/or the actuated device according to the target attitude, orientation, position, and/or course. Such control signals may be transmitted to controller 912 (e.g., using communications modules 934 and 120), which may then control platform 910 and/or elements of platform 910 accordingly.

Communications module 934 may be implemented as any wired and/or wireless communications module configured to transmit and receive analog and/or digital signals between elements of system 900. For example, communications module 934 may be configured to transmit flight control signals from user interface 932 to communications module 920 or 944. In other embodiments, communications module 934 may be configured to receive sensor data (e.g., visible spectrum and/or infrared still images or video images, or other sensor data) from sensor payload 940. In some embodiments, communications module 934 may be configured to support spread spectrum transmissions, for example, and/or multiple simultaneous communications channels between elements of system 900. In various embodiments, communications module 934 may be configured to monitor the status of a communication link established between base station 930, sensor payload 940, and/or platform 910 (e.g., including packet loss of transmitted and received data between elements of system 900, such as with digital communication links), as described herein. Such status information may be provided to user interface 932, for example, or transmitted to other elements of system 900 for monitoring, storage, or further processing, as described herein.

Other modules 936 of base station 930 may include other and/or additional sensors, actuators, communications modules/nodes, and/or user interface devices used to provide additional environmental information associated with base station 930, for example. In some embodiments, other modules 936 may include a humidity sensor, a wind and/or water temperature sensor, a barometer, a radar system, a visible spectrum camera, an infrared camera, a GNSS, an analyte sensor system, and/or other environmental sensors providing measurements and/or other sensor signals that can be displayed to a user and/or used by other devices of system 900 (e.g., controller 912) to provide operational control of platform 910 and/or system 900 or to process sensor data to compensate for environmental conditions, such as an water content in the atmosphere approximately at the same altitude and/or within the same area as platform 910 and/or base station 930, for example. In some embodiments, other modules 936 may include one or more actuated and/or articulated devices (e.g., multi-spectrum active illuminators, visible and/or infrared/thermal cameras, radars, sonars, and/or other actuated devices), where each actuated device includes one or more actuators adapted to adjust an orientation of the device in response to one or more control signals (e.g., provided by user interface 932).

In embodiments where imaging system/sensor payload 940 is implemented as an imaging device, imaging system/sensor payload 940 may include imaging module 942, which may be implemented as a cooled and/or uncooled array of detector elements, such as visible spectrum and/or infrared sensitive detector elements, including quantum well infrared photodetector elements, bolometer or microbolometer based detector elements, type II superlattice based detector elements, and/or other infrared spectrum or thermal detector elements that can be arranged in a focal plane array. In various embodiments, imaging module 942 may include one or more logic devices (e.g., similar to controller 912) that can be configured to process imagery captured by detector elements of imaging module 942 before providing the imagery to memory 946 or communications module 944. More generally, imaging module 942 may be configured to perform any of the operations or methods described herein, at least in part, or in combination with controller 912 and/or user interface 932.

In some embodiments, sensor payload 940 may be implemented with a second or additional imaging modules similar to imaging module 942, for example, that may include detector elements configured to detect other electromagnetic spectrums, such as visible light, ultraviolet, thermal, and/or other electromagnetic spectrums or subsets of such spectrums. In various embodiments, such additional imaging modules may be calibrated or registered to imaging module 942 such that images captured by each imaging module occupy a known and at least partially overlapping field of view of the other imaging modules, thereby allowing different spectrum images to be geometrically registered to each other (e.g., by scaling and/or positioning). In some embodiments, different spectrum images may be registered to each other using pattern recognition processing in addition or as an alternative to reliance on a known overlapping field of view.

Communications module 944 of sensor payload 940 may be implemented as any wired and/or wireless communications module configured to transmit and receive analog and/or digital signals between elements of system 900. For example, communications module 944 may be configured to transmit visible spectrum or thermal images from imaging module 942 to communications module 920 or 934. In other embodiments, communications module 944 may be configured to receive control signals (e.g., control signals directing capture, focus, selective filtering, and/or other operation of sensor payload 940) from controller 912 and/or user interface 932. In some embodiments, communications module 944 may be configured to support spread spectrum transmissions, for example, and/or multiple simultaneous communications channels between elements of system 900. In various embodiments, communications module 944 may be configured to monitor the status of a communication link established between sensor payload 940, base station 930, and/or platform 910 (e.g., including packet loss of transmitted and received data between elements of system 900, such as with digital communication links), as described herein. Such status information may be provided to imaging module 942, for example, or transmitted to other elements of system 900 for monitoring, storage, or further processing, as described herein.

Memory 946 may be implemented as one or more machine readable mediums and/or logic devices configured to store software instructions, sensor signals, control signals, operational parameters, calibration parameters, infrared images, and/or other data facilitating operation of system 900, for example, and provide it to various elements of system 900. Memory 946 may also be implemented, at least in part, as removable memory, such as a secure digital memory card for example including an interface for such memory.

Orientation sensor 948 of sensor payload 940 may be implemented similar to orientation sensor 914 or gyroscope/accelerometer 916, and/or any other device capable of measuring an orientation of sensor payload 940, imaging module 942, and/or other elements of sensor payload 940 (e.g., magnitude and direction of roll, pitch, and/or yaw, relative to one or more reference orientations such as gravity and/or Magnetic North) and providing such measurements as sensor signals that may be communicated to various devices of system 900. Gyroscope/accelerometer (e.g., angular motion sensor) 950 of sensor payload 940 may be implemented as one or more electronic sextants, semiconductor devices, integrated chips, accelerometer sensors, accelerometer sensor systems, or other devices capable of measuring angular velocities/accelerations (e.g., angular motion) and/or linear accelerations (e.g., direction and magnitude) of sensor payload 940 and/or various elements of sensor payload 940 and providing such measurements as sensor signals that may be communicated to various devices of system 900.

Other modules 952 of sensor payload 940 may include other and/or additional sensors, actuators, communications modules/nodes, cooled or uncooled optical filters, and/or user interface devices used to provide additional environmental information associated with sensor payload 940, for example. In some embodiments, other modules 952 may include a humidity sensor, a wind and/or water temperature sensor, a barometer, a radar system, a visible spectrum camera, an infrared camera, a GNSS, an analyte sensor system, and/or other environmental sensors providing measurements and/or other sensor signals that can be displayed to a user and/or used by imaging module 942 or other devices of system 900 (e.g., controller 912) to provide operational control of platform 910 and/or system 900 or to process imagery to compensate for environmental conditions.

In alternative embodiments, where payload 940 is implemented as a package to be delivered to a target position, location, or destination, gimbal system 922 may be implemented as an actuated payload coupler configured to decouple or release or drop payload 940 (e.g., as controlled by controller 912, user interface 932, and/or other elements of system 900) from platform 910.

As shown in FIG. 9, TIOS 960 may be implemented as thermal imaging based optical odometry system configured to determine and provide a position and/or orientation of platform 910, such as during and/or to compensate for a navigation crisis, or to generate a depth map of an environment about platform 910, as described herein. For example; in various embodiments, controller 912 and/or other elements of system 900 may be configured to detect loss of position data from GNSS 918, low light conditions in visible spectrum images provided by imaging system 940, loss of communication between platform 910 and base station 930 and/or other UAV navigation crises, for example, to control TIOS 960 to capture thermal images of a scene about platform 910, and perform odometry or determine a depth map based on such thermal images, as described herein.

In the embodiment shown in FIG. 9, TIOS 960 includes optional TIOS controller 962, thermal imaging module 964, ranging sensor system 966, communications module 968, and other modules 970. Optional TIOS controller 962 may be configured to receive control signals and/or telemetry from platform 910 (e.g., via communications module 920 and/or TIOS coupler 928), for example, and/or to receive telemetry from sensors integrated with payload 940 (e.g., orientation sensor 948, gyroscope/accelerometer 150, other modules 952) and/or TIOS 960 (e.g., other modules 970), control operation of elements of TIOS 960, and/or determine positions, orientations, and/or velocities of platform 910 or a one or more depth maps based, at least in part, on the received control signals and/or telemetry. In some embodiments, TIOS controller 962 may be configured to determine positions, orientations, and/or velocities of platform 910 and/or depth maps independent of control signals and/or telemetry provided by other elements of platform 910, base station 930, and/or system 900.

More generally, TIOS controller 962 may be implemented as one or more of any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of TIOS 960 and/or other elements of TIOS 960, for example. Such software instructions may also implement methods for processing sensor signals, determining sensor information, providing user feedback (e.g., through user interface 932 via communications through TIOS coupler 928 and/or communications module 920), querying devices for operational parameters, selecting operational parameters for devices, or performing any of the various operations described herein. In various embodiments, TIOS controller 962 may be implemented by, integrated with, and/or be configured to provide the functionality of any one or combination of the elements of control system 400 of FIG. 4.

In addition, a non-transitory medium may be provided for storing machine readable instructions for loading into and execution by TIOS controller 962, and such non-transitory medium may be implemented as internal and/or external memory and/or associated interfaces. In these and other embodiments, TIOS controller 962 may be implemented with other components where appropriate, such as volatile memory, non-volatile memory, one or more interfaces, and/or various analog and/or digital components for interfacing with modules of TIOS 960 and/or devices of system 900. For example, TIOS controller 962 may be adapted to store sensor signals, sensor information, parameters for coordinate frame transformations, calibration parameters, sets of calibration points, and/or other operational parameters, over time, for example, and provide such stored data to a user using user interface 932. In some embodiments, TIOS controller 962 may be integrated with one or more other elements of TIOS 960, for example, or distributed as multiple logic devices within platform 910, base station 930, and/or TIOS 960.

In some embodiments, controller 962 may be configured to substantially continuously monitor and/or store the status of and/or sensor data provided by one or more elements of TIOS 960, such as the position and/or orientation of platform 910, TIOS 960, and/or base station 930, for example, and the status of a communication link established between platform 910, TIOS 960, and/or base station 930. Such communication links may be configured to be established and then transmit data between elements of system 900 substantially continuously throughout operation of system 900, where such data includes various types of sensor data, control parameters, control signals, and/or other data.

Thermal imaging module 964 may be implemented similarly to imaging module 942 of imaging system 940, for example, but limited to providing thermal images of a scene or environment about platform 910. More specifically, thermal imaging module 964 may be configured to be coupled to platform 910 (e.g., via TIOS coupler 128) and provide thermal imagery of a scene about platform 910 that is centered about an optical axis of thermal imaging module 964, where the optical axis is fixed relative to an orientation of platform 910, such as via TIOS coupler 928 and/or a housing of TIOS 960 (e.g., control unit housing 106 of FIGS. 1A-E, upper and lower control unit housings 306 and 308 of FIG. 3). In some embodiments, thermal imaging module 964 may be implemented as a stereo vision system (e.g., two thermal imaging modules) configured to provide thermal image data that may be used to provide two simultaneous thermal images from which a depth map may be generated. In general, such stereo vision system may be characterized, at least in part, by an intra-axial distance between first and second thermal imaging modules of the stereo vision system.

More generally, thermal imaging module 964 may also be characterized, at least in part, by a frame rate at which it can provide full frame thermal images. Such frame rate (e.g., generally from 9 to 60 Hz) limits the speed at which platform 910 can traverse an environment while maintaining reliable optical odometry for platform 910, in that at least one point of interest should be viewable (e.g., within the field of view of thermal imaging module 964) in time-adjoining thermal image frames generated by thermal imaging module 964.

Communications module 968 may be implemented similarly to communications modules 920, 934, and/or 944 and be configured to operate similarly to transmit and receive analog and/or digital signals between elements of system 900 using such communication links, including sensor data, control signals, control parameters, and/or other data, as described herein.

Ranging sensor system 966 may be implemented as any one or combination of ranging sensor elements configured to provide ranging sensor data indicating at least a standoff distance between thermal imaging module 964 and a surface disposed within a scene about platform 910 and intersecting an optical axis of thermal imaging module 966. In some embodiments, ranging sensor system 966 may be implemented as a laser rangefinder (e.g., laser rangefinder 110 of FIGS. 1A-E) fixed relative to thermal imaging module 964 (e.g., mounted so as to have an orientation fixed relative to an orientation of thermal imaging module 964) such that the optical axis of its laser is substantially parallel to the optical axis of thermal imaging module 964. In other embodiments, ranging sensor system 966 may be implemented as a radar, sonar, lidar, and/or other ranging sensor system fixed relative to thermal imaging module 964 and configured to provide two and/or three dimensional ranging sensor data corresponding to a depth map overlapping a field of view of thermal imaging module 964 and/or substantially centered about the optical axis of thermal imaging module 964.

Other modules 970 of TIOS 960 may include other and/or additional sensors, actuators, communications modules/nodes, and/or user interface devices used to provide additional operational and/or environmental information associated with TIOS 960, for example. In some embodiments, other modules 970 may include a humidity sensor, a wind and/or water temperature sensor, a barometer, an orientation sensor, a gyroscope/accelerometer, a GNSS, and/or other navigational or environmental sensors providing measurements and/or other sensor signals that can be displayed to a user and/or used by TIOS controller 962 or other devices of system 900 (e.g., controller 912) to provide operational control of TIOS 960, platform 910, and/or system 900, as described herein.

In some embodiments, other modules 970 may include a housing (e.g., similar to control unit housing 106 of FIGS. 1A-E, upper and lower control unit housings 306 and 308 of FIG. 3) configured to secure and/or protect thermal imaging module 964 and to fix an orientation of ranging sensor system 966 relative to the optical axis of thermal imaging module 964. Such housing may engage with TIOS coupler 928 to secure TIOS 960 to platform 910 and/or to fix the optical axis of thermal imaging module 964 relative to an orientation of platform 910, so as to facilitate determining an orientation and/or position of platform 910 based on an orientation and/or position of thermal imaging module 964 and/or TIOS 960, as described herein. In various embodiments, other modules 970 may include a power supply implemented as any power storage device configured to provide enough power to each element of TIOS 960 to keep all such elements active and operable while TIOS 960 is otherwise disconnected from external power (e.g., provided by platform 910 and/or base station 930). In various embodiments, such power supply may be implemented by a supercapacitor so as to be relatively lightweight and facilitate flight of platform 910.

Although system 900 is shown in FIG. 9 with a single TIOS 960 coupled to platform 910 through TIOS coupler 928, in other embodiments, system 900 may include multiple TIOSs 160, each of which may be coupled to platform 910 (e.g., to assist in navigation of platform 910). In some embodiments, one TIOS may include ranging sensor system 966 and be configured to determine a velocity of platform 910, and one or more other TIOSs coupled to platform 910 may be configured to determine depth maps according to differentiated (e.g., orthogonal and/or antiparallel) fields of view.

In general, each of the elements of system 900 may be implemented with any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a method for providing sensor data and/or imagery, for example, or for transmitting and/or receiving communications, such as sensor signals, sensor information, and/or control signals, between one or more devices of system 900.

In addition, one or more non-transitory mediums may be provided for storing machine readable instructions for loading into and execution by any logic device implemented with one or more of the devices of system 900. In these and other embodiments, the logic devices may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces, such as an interface for one or more antennas, or an interface for a particular type of sensor).

Sensor signals, control signals, and other signals may be communicated among elements of system 900 using a variety of wired and/or wireless communication techniques, including voltage signaling, Ethernet, WiFi, Bluetooth, Zigbee, Xbee, Micronet, or other medium and/or short range wired and/or wireless networking protocols and/or implementations, for example. In such embodiments, each element of system 900 may include one or more modules supporting wired, wireless, and/or a combination of wired and wireless communication techniques. In some embodiments, various elements or portions of elements of system 900 may be integrated with each other, for example, or may be integrated onto a single printed circuit board (PCB) to reduce system complexity, manufacturing costs, power requirements, coordinate frame errors, and/or timing errors between the various sensor measurements.

Each element of system 900 may include one or more batteries, capacitors, or other electrical power storage devices, for example, and may include one or more solar cell modules or other electrical power generating devices. In some embodiments, one or more of the devices may be powered by a power source for platform 910, using one or more power leads. Such power leads may also be used to support one or more communication techniques between elements of system 900.

Figure 10:
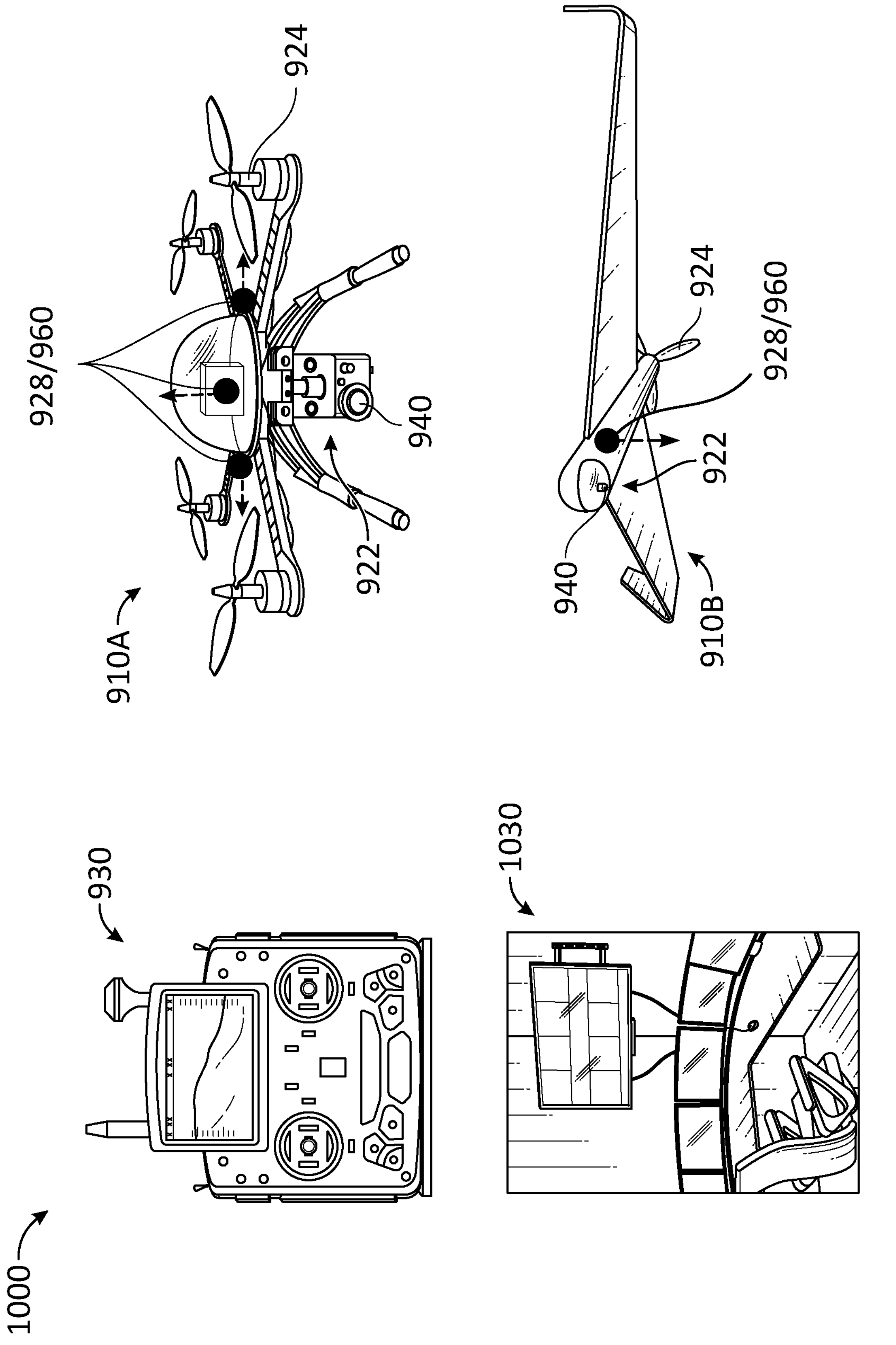
FIG. 10 illustrates a diagram of a UAS including UAVs with TOISs in accordance with an embodiment of the disclosure.

FIG. 10 illustrates a diagram of mobile platforms/UAVs 110A and 110B of UAS 1000 including embodiments of TIOS 960 and associated TIOS coupler 928 in accordance with an embodiment of the disclosure. In the embodiment shown in FIG. 10, UAS 1000 includes base station 930, optional co-pilot station 1030, mobile platform 910A with articulated imaging system/sensor payload 940, gimbal system 922, multiple TIOSs 960 (e.g., each with optical axes oriented orthogonally or antiparallel to each other-vertically up, laterally starboard and port—as shown by their respective dashed arrows), and multiple TIOS couplers 928, and mobile platform 910B with articulated imaging system/sensor payload 940, gimbal system 922, TIOS 960 (e.g., with an optical axis oriented vertically down in the reference frame of platform 910B), and TIOS coupler 928, where base station 930 and/or optional co-pilot station 1030 may be configured to control motion, position, orientation, and/or general operation of platform 910A, platform 910B, sensor payloads 140, and/or TIOSs 160.

In various embodiments, co-pilot station 1030 may be implemented similarly to base station 930, such as including similar elements and/or being capable of similar functionality. In some embodiments, co-pilot station 1030 may include a number of displays so as to facilitate operation of TIOS 960 and/or various imaging and/or sensor payloads of mobile platforms 110A-B, generally separate from piloting mobile platforms 110A-B, and to facilitate substantially real time analysis, visualization, and communication of sensor data and corresponding directives, such as to first responders in contact with a co-pilot or user of system 200. For example, base station 930 and co-pilot station 1030 may each be configured to render any display views described herein.

Figure 11:
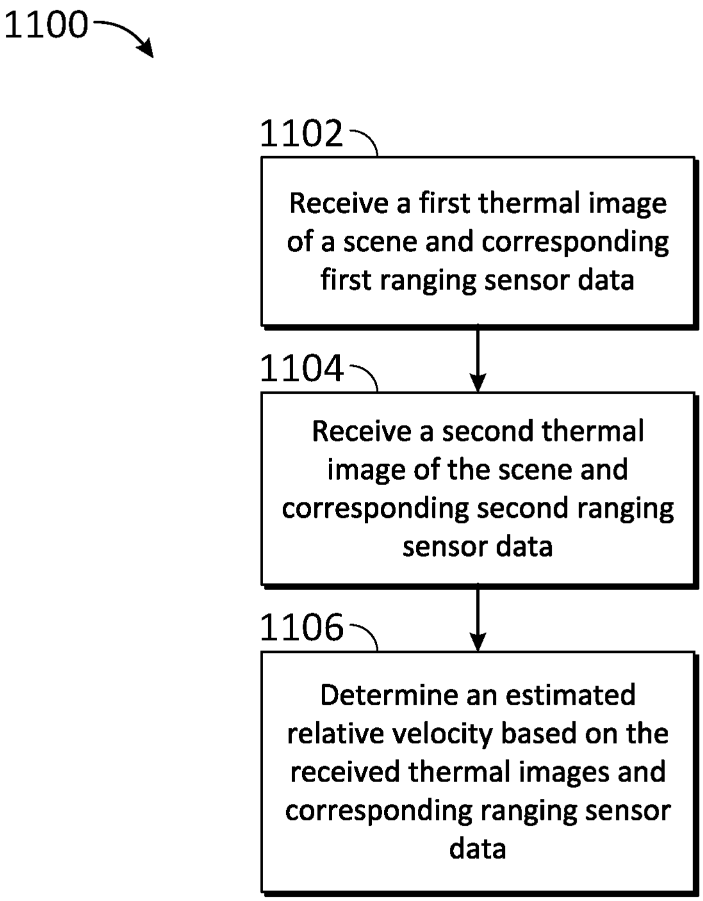
FIG. 11 illustrates a flow diagram of various operations to operate a TIOS in accordance with an embodiment of the disclosure.

FIG. 11 illustrates a flow diagram 1100 of various operations to operate TIOS 960 in accordance with an embodiment of the disclosure. In some embodiments, the operations of FIG. 11 may be implemented as software instructions executed by one or more logic devices or controllers associated with corresponding methods, electronic devices, sensors, and/or structures depicted in FIGS. 1-10. More generally, the operations of FIG. 11 may be implemented with any combination of software instructions, mechanical elements, and/or electronic hardware (e.g., inductors, capacitors, amplifiers, actuators, or other analog and/or digital components). Any step, sub-step, sub-process, or block of process 1100 may be performed in an order or arrangement different from the embodiment illustrated by FIG. 11. For example, in other embodiments, one or more blocks may be omitted from or added to process 1100. Furthermore, block inputs, block outputs, various sensor signals, sensor information, calibration parameters, and/or other operational parameters may be stored to one or more memories prior to moving to a following portion of a corresponding process. Although process 1100 is described with reference to systems and methods described in FIGS. 1-10, process 1100 may be performed by other systems different from those systems and including a different selection of electronic devices, sensors, assemblies, mechanisms, platforms, and/or platform attributes.

At block 1102, a first thermal image and corresponding first ranging sensor data is received. For example, controller 912 and/or TIOS controller 962 may be configured to receive a first thermal image of the scene at a first time from the thermal imaging module and corresponding first ranging sensor data from the ranging sensor system fixed relative to the thermal imaging module. In some embodiments, controller 912 and/or TIOS controller 962 may also be configured to receive a first orientation of the unmanned vehicle and/or the thermal imaging module associated with the first thermal image from an orientation sensor coupled to the unmanned vehicle and/or the thermal imaging module, for example, which may occur substantially simultaneously with receiving the first thermal image.

In various embodiments, controller 912 and/or TIOS controller 962 may be configured to receive a user-defined target position and/or course for the unmanned vehicle prior to receiving the first thermal image, such as a target destination position and/or an associated course or track to maneuver the unmanned vehicle to the target destination position, as described herein.

At block 1104, a second thermal image and corresponding second ranging sensor data is received. For example, controller 912 and/or TIOS controller 962 may be configured to receive a second thermal image of the scene at a second time and corresponding second ranging sensor data from the ranging sensor system. In some embodiments, controller 912 and/or TIOS controller 962 may also be configured to receive a second orientation of the unmanned vehicle and/or the thermal imaging module associated with the second thermal image from an orientation sensor coupled to the unmanned vehicle and/or the thermal imaging module, for example, which may occur substantially simultaneously with receiving the second thermal image.

In various embodiments, controller 912 and/or TIOS controller 962 may be configured to receive first and/or second accelerations of the unmanned vehicle and/or the thermal imaging module, corresponding respectively to the first and/or second thermal images, from an accelerometer coupled to the unmanned vehicle and/or the thermal imaging module. Such acceleration data may be provided substantially simultaneously, respectively with receiving the corresponding first and second thermal images.

At block 1106, an estimated relative velocity is determined. For example, controller 912 and/or TIOS controller 962 may be configured to determine an estimated relative velocity of the unmanned vehicle based, at least in part, on the received first and second thermal images and the respective corresponding first and second ranging sensor data.

In various embodiments, the determining the estimated relative velocity of the unmanned vehicle may include identifying one or more common points of interest in the first and second thermal images, determining an optical flow rate based, at least in part, on a position deviation for each common point of interest identified in the first and second thermal images, and/or determining the estimated relative velocity of the unmanned vehicle based, at least in part, on the determined optical flow rate and the first and/or second ranging sensor data, as described herein. In such embodiments, controller 912 and/or TIOS controller 962 may be configured to determine an angular velocity of the unmanned vehicle and/or the thermal imaging module based, at least in part, on first and second orientations of the unmanned vehicle and/or the thermal imaging module associated with the first and second thermal images provided by an orientation sensor coupled to the unmanned vehicle and/or the thermal imaging module, where the determining the estimated relative velocity of the unmanned vehicle may include determining a net flow rate based, at least in part, on the determined optical flow rate and angular velocity, and determining the estimated relative velocity of the unmanned vehicle based, at least in part, on the net flow rate, as described herein.

In embodiments where first and second orientations of the unmanned vehicle and/or the thermal imaging module have been received, controller 912 and/or TIOS controller 962 may be configured to determine an absolute velocity of the unmanned vehicle based, at least in part, on the received first and second orientations and the determined estimated relative velocity of the unmanned vehicle.

In embodiments where a user-defined target position and/or course for the unmanned vehicle has been received, controller 912 and/or TIOS controller 962 may be configured to determine an absolute velocity of the unmanned vehicle based, at least in part, on the determined estimated relative velocity of the unmanned vehicle, to determine a heading adjustment for the unmanned vehicle based, at least in part, on the received user-defined target position and/or course and the determined absolute velocity of the unmanned vehicle, and/or to control a propulsion system of the unmanned vehicle to update a heading of the unmanned vehicle according to the heading adjustment.

In some embodiments, controller 912 and/or TIOS controller 962 may be configured to determine no common points of interest exist in the first and second thermal images and determine the estimated relative velocity of the unmanned vehicle based, at least in part, on received first and second orientations and first and/or second accelerations of the unmanned vehicle and/or the thermal imaging module.

In further embodiments, controller 912 and/or TIOS controller 962 may be configured to determine no common points of interest exist in the first and second thermal images, identify one or more common points of interest in the first or second thermal image and a third image received prior to the first image or subsequent to the second image, determine an optical flow rate based, at least in part, on a position deviation for each common point of interest identified in the first or second thermal image and the third image, and/or determine the estimated relative velocity of the unmanned vehicle based, at least in part, on the determined optical flow rate and the first or second ranging sensor data and third ranging sensor data corresponding to the third image, as described herein.

As described with reference to FIGS. 2A-B, controller 912 and/or TIOS controller 962 may be configured to implement a control loop operating on successive thermal images provided by thermal imaging module 964. For example, controller 912 and/or TIOS controller 962 may be configured to receive a third thermal image of the scene at a third time and corresponding third ranging sensor data from the ranging sensor system and determine a second estimated relative velocity of the unmanned vehicle based, at least in part, on the received second and third thermal images and the respective corresponding second and third ranging sensor data.

In alternative embodiments, controller 912 and/or TIOS controller 962 may be configured to receive an absolute velocity of the unmanned vehicle from GNSS 918 and/or another thermal odometry system coupled to the unmanned vehicle; for example, and to determine a depth map corresponding to a field of view of the thermal imaging module based, at least in part, on the first and second thermal images and the received absolute velocity of the unmanned vehicle.

In embodiments where the thermal imaging module comprises a stereo vision system characterized, at least in part, by an intra-axial distance between first and second thermal imaging modules of the stereo vision system, the first and second times corresponding to the first and second thermal images may be the same or a common time (e.g., where the images are captured substantially simultaneously). In embodiments where such stereo vision system includes a ranging sensor system (e.g., to facilitate data fusion, as described herein), the first and second ranging sensor data may be the same or common ranging sensor data (e.g., where a single ranging sensor system is used for the stereo vision system).

In some embodiments, such as where the stereo vision system omits a ranging sensor system and/or the common ranging sensor data is not used, and the determining the estimated relative velocity of the unmanned vehicle may be based, at least in part, on the first and second thermal images and the intra-axial distance of the stereo vision system, as described herein. Moreover, controller 912 and/or TIOS controller 962 may be configured to generate a depth map based, at least in part, on the first and second thermal images and the intra-axial distance of the stereo vision system. In other embodiments, where the stereo vision system includes a ranging sensor system and the common ranging sensor data is used, and the determining the estimated relative velocity of the unmanned vehicle may be based, at least in part, on the first and second thermal images, the common ranging sensor data, and the intra-axial distance of the stereo vision system, as described herein. Moreover, controller 912 and/or TIOS controller 962 may be configured to generate a depth map based, at least in part, on the first and second thermal images, the common ranging sensor data, and the intra-axial distance of the stereo vision system.

By providing such systems and techniques for thermal imaging odometry and/or navigation, embodiments of the present disclosure substantially improve the operational flexibility and reliability of unmanned vehicles, and particularly unmanned flight platforms. Moreover, such systems and techniques may be used to increase the operational safety of unmanned vehicles beyond that achievable by conventional systems. As such, embodiments provide unmanned vehicle odometry and/or navigation systems with significantly increased convenience and performance. In particular, while embodiments described herein have a drift rate associated with them, comparable dead reckoning systems based on an IMU will suffer from much greater error. For example, common and/or relatively inexpensive MEMS based IMUs can only hold a position within 50 m over a 10 second duration, and their positional error increases exponentially with time. By contrast, the position error associated with embodiments of the present disclosure only increases at most linearly. This is a result of the IMU based systems deriving position from integrating accelerations twice, while embodiments described herein receive a velocity reading directly that only needs to be integrated numerically once to derive position.

Where applicable, various embodiments provided by the present disclosure can be implemented using hardware, software, or combinations of hardware and software. Also, where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine-readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the present invention. Accordingly, the scope of the invention is defined only by the following claims.

The invention claimed is:

1. A method comprising:

receiving a first thermal image of a scene about an unmanned vehicle at a first time from a thermal imaging module coupled to the unmanned vehicle and corresponding first ranging sensor data from a ranging sensor system fixed relative to the thermal imaging module, wherein:

the thermal imaging module is configured to provide thermal imagery of the scene, wherein the scene is centered about an optical axis of the thermal imaging module;

the optical axis of the thermal imaging module is fixed relative to an orientation of the unmanned vehicle; and the ranging sensor system is configured to provide ranging sensor data indicating a standoff distance between the thermal imaging module and a surface within the scene and intersecting the optical axis of the thermal imaging module;

receiving a second thermal image of the scene at a second time and corresponding second ranging sensor data from the ranging sensor system; and determining an estimated relative velocity of the unmanned vehicle based, at least in part, on the received first and second thermal images and the respective corresponding first and second ranging sensor data, wherein determining the estimated relative velocity comprises:

identifying one or more common points of interest in the first and second thermal images;

determining an optical flow rate based, at least in part, on a position deviation for each common point of interest identified in the first and second thermal images;

characterizing a dilation or contraction of a field of the common points of interest indicative of motion along the optical axis of the thermal imaging module; and removing a contribution of the dilation or contraction from the optical flow rate in obtaining the estimated relative velocity.

2. The method of claim 1, wherein the determining the estimated relative velocity comprises using the characterized dilation or contraction to construct a depth map corresponding to the field of view of the thermal imaging module; and wherein the method further comprises:

receiving a first orientation of the unmanned vehicle and/or the thermal imaging module associated with the first thermal image from an orientation sensor coupled to the unmanned vehicle and/or the thermal imaging module;

receiving a second orientation of the unmanned vehicle and/or the thermal imaging module associated with the second thermal image from the orientation sensor; and determining an absolute velocity of the unmanned vehicle based, at least in part, on the received first and second orientations and the determined estimated relative velocity of the unmanned vehicle.

3. The method of claim 1, wherein:

the determining the estimated relative velocity comprises using the characterized dilation or contraction to supplement the ranging sensor data indicating the standoff distance; and the method further comprises:

receiving a user-defined target position and/or course for the unmanned vehicle;

determining an absolute velocity of the unmanned vehicle based, at least in part, on the determined estimated relative velocity of the unmanned vehicle;

determining a heading adjustment for the unmanned vehicle based, at least in part, on the received user-defined target position and/or course and the determined absolute velocity of the unmanned vehicle; and controlling a propulsion system of the unmanned vehicle to update a heading of the unmanned vehicle according to the heading adjustment.

4. The method of claim 1, wherein the removing is performed by averaging across the field of the common points of interest.

5. The method of claim 1, further comprising:

determining an angular velocity of the unmanned vehicle and/or the thermal imaging module based, at least in part, on first and second orientations of the unmanned vehicle and/or the thermal imaging module associated with the first and second thermal images provided by an orientation sensor coupled to the unmanned vehicle and/or the thermal imaging module, wherein the determining the estimated relative velocity of the unmanned vehicle comprises:

determining a net flow rate based, at least in part, on the determined optical flow rate and angular velocity; and determining the estimated relative velocity of the unmanned vehicle based, at least in part, on the net flow rate.

6. The method of claim 1, wherein the determining the estimated relative velocity of the unmanned vehicle comprises:

determining no common points of interest exist in the first and second thermal images;

receiving first and second orientations of the unmanned vehicle and/or the thermal imaging module, corresponding respectively to the first and/or second thermal images, from an orientation sensor coupled to the unmanned vehicle and/or the thermal imaging module;

receiving first and/or second accelerations of the unmanned vehicle and/or the thermal imaging module, corresponding respectively to the first and/or second thermal images, from an accelerometer coupled to the unmanned vehicle and/or the thermal imaging module; and determining the estimated relative velocity of the unmanned vehicle based, at least in part, on the received first and second orientations and first and/or second accelerations.

7. The method of claim 1, wherein the determining the estimated relative velocity of the unmanned vehicle comprises:

determining no common points of interest exist in the first and second thermal images;

identifying one or more common points of interest in the first or second thermal image and a third image received prior to the first thermal image or subsequent to the second thermal image;

determining a second optical flow rate based, at least in part, on a second position deviation for each common point of interest identified in the first or second thermal image and the third image; and determining the estimated relative velocity of the unmanned vehicle based, at least in part, on the second determined optical flow rate and the first or second ranging sensor data and third ranging sensor data corresponding to the third image.

8. The method of claim 1, wherein the estimated relative velocity comprises a first estimated relative velocity, the method further comprising:

receiving a third thermal image of the scene at a third time and corresponding third ranging sensor data from the ranging sensor system; and determining a second estimated relative velocity of the unmanned vehicle based, at least in part, on the received second and third thermal images and the respective corresponding second and third ranging sensor data.

9. The method of claim 1, further comprising:

receiving an absolute velocity of the unmanned vehicle from a global navigation satellite system and/or another thermal odometry system coupled to the unmanned vehicle; and determining a depth map corresponding to a field of view of the thermal imaging module based, at least in part, on the first and second thermal images and the received absolute velocity of the unmanned vehicle.

10. The method of claim 1, wherein:

the thermal imaging module comprises a stereo vision system characterized, at least in part, by an intra-axial distance between first and second thermal imaging modules of the stereo vision system;

the first and second times comprise a common time; and the determining the estimated relative velocity of the unmanned vehicle is based, at least in part, on the first and second thermal images and the intra-axial distance of the stereo vision system.

11. A thermal imaging odometry system for an unmanned vehicle, the thermal imaging odometry system comprising:

a thermal imaging module configured to be coupled to the unmanned vehicle and to provide thermal imagery of a scene in view of the unmanned vehicle, wherein the scene is centered about an optical axis of the thermal imaging module, and wherein the optical axis of the thermal imaging module is fixed relative to an orientation of the unmanned vehicle;

a ranging sensor system fixed relative to the thermal imaging module and configured to provide ranging sensor data indicating a standoff distance between the thermal imaging module and a surface within the scene and intersecting the optical axis of the thermal imaging module; and a logic device coupled to and/or integrated with the thermal imaging module, the ranging sensor system, and/or the unmanned vehicle, wherein the logic device is configured to:

receive a first thermal image of the scene at a first time from the thermal imaging module and corresponding first ranging sensor data from the ranging sensor system;

receive a second thermal image of the scene at a second time and corresponding second ranging sensor data from the ranging sensor system; and determine an estimated relative velocity of the unmanned vehicle based, at least in part, on the received first and second thermal images and the respective corresponding first and second ranging sensor data, wherein determining the estimated relative velocity comprises:

identifying one or more common points of interest in the first and second thermal images;

determining an optical flow rate based, at least in part, on a position deviation for each common point of interest identified in the first and second thermal images;

characterizing a dilation or contraction of a field of the common points of interest indicative of motion along the optical axis of the thermal imaging module; and removing a contribution of the dilation or contraction from the optical flow rate in obtaining the estimated relative velocity.

12. The thermal imaging odometry system of claim 11, wherein:

the determining the estimated relative velocity comprises using the characterized dilation or contraction to construct a depth map corresponding to a field of view of the thermal imaging module; and the logic device is configured to:

receive a first orientation of the unmanned vehicle and/or the thermal imaging module associated with the first thermal image from an orientation sensor coupled to the unmanned vehicle and/or the thermal imaging module;

receive a second orientation of the unmanned vehicle and/or the thermal imaging module associated with the second thermal image from the orientation sensor; and determine an absolute velocity of the unmanned vehicle based, at least in part, on the received first and second orientations and the determined estimated relative velocity of the unmanned vehicle.

13. The thermal imaging odometry system of claim 11, wherein:

the determining the estimated relative velocity comprises using the characterized dilation or contraction to supplement the ranging sensor data indicating the standoff distance; and the logic device is configured to:

receive a user-defined target position and/or course for the unmanned vehicle;

determine an absolute velocity of the unmanned vehicle based, at least in part, on the determined estimated relative velocity of the unmanned vehicle;

determine a heading adjustment for the unmanned vehicle based, at least in part, on the received user-defined target position and/or course and the determined absolute velocity of the unmanned vehicle; and control a propulsion system of the unmanned vehicle to update a heading of the unmanned vehicle according to the heading adjustment.

14. The thermal imaging odometry system of claim 11, wherein the removing is performed by averaging across the field of the common points of interest.

15. The thermal imaging odometry system of claim 11, wherein:

the unmanned vehicle comprises an unmanned aerial vehicle;

the logic device is configured to determine an angular velocity of the unmanned vehicle and/or the thermal imaging module based, at least in part, on first and second orientations of the unmanned vehicle and/or the thermal imaging module associated with the first and second thermal images provided by an orientation sensor coupled to the unmanned vehicle and/or the thermal imaging module; and the determining the estimated relative velocity of the unmanned vehicle comprises:

determining a net flow rate based, at least in part, on the determined optical flow rate processed by the removing the contribution of the dilation or contraction, and angular velocity; and determining the estimated relative velocity of the unmanned vehicle based, at least in part, on the net flow rate.

16. The thermal imaging odometry system of claim 11, wherein the determining the estimated relative velocity of the unmanned vehicle comprises:

determining no common points of interest exist in the first and second thermal images;

receiving first and second orientations of the unmanned vehicle and/or the thermal imaging module, corresponding respectively to the first and/or second thermal images, from an orientation sensor coupled to the unmanned vehicle and/or the thermal imaging module;

receiving first and/or second accelerations of the unmanned vehicle and/or the thermal imaging module, corresponding respectively to the first and/or second thermal images, from an accelerometer coupled to the unmanned vehicle and/or the thermal imaging module; and determining the estimated relative velocity of the unmanned vehicle based, at least in part, on the received first and second orientations and first and/or second accelerations.

17. The thermal imaging odometry system of claim 11, wherein the determining the estimated relative velocity of the unmanned vehicle comprises:

determining no common points of interest exist in the first and second thermal images;

identifying one or more common points of interest in the first or second thermal image and a third image received prior to the first thermal image or subsequent to the second thermal image;

determining a second optical flow rate based, at least in part, on a second position deviation for each common point of interest identified in the first or second thermal image and the third image; and determining the estimated relative velocity of the unmanned vehicle based, at least in part, on the second determined optical flow rate and the first or second ranging sensor data and third ranging sensor data corresponding to the third image.

18. The thermal imaging odometry system of claim 11, wherein:

the estimated relative velocity comprises a first estimated relative velocity, and wherein the logic device is configured to:

receive a third thermal image of the scene at a third time and corresponding third ranging sensor data from the ranging sensor system; and determine a second estimated relative velocity of the unmanned vehicle based, at least in part, on the received second and third thermal images and the respective corresponding second and third ranging sensor data.

19. The thermal imaging odometry system of claim 11, wherein the logic device is configured to:

receive an absolute velocity of the unmanned vehicle from a global navigation satellite system and/or another thermal odometry system coupled to the unmanned vehicle; and determine a depth map corresponding to a field of view of the thermal imaging module based, at least in part, on the first and second thermal images and the received absolute velocity of the unmanned vehicle.

20. The thermal imaging odometry system of claim 11, wherein:

the thermal imaging module comprises a stereo vision system characterized, at least in part, by an intra-axial distance between first and second thermal imaging modules of the stereo vision system;

the first and second times comprise a common time; and the determining the estimated relative velocity of the unmanned vehicle is based, at least in part, on the first and second thermal images and the intra-axial distance of the stereo vision system.

* * * * *